(12) United States Patent
Hakkaku et al.

(10) Patent No.: US 11,148,353 B2
(45) Date of Patent: Oct. 19, 2021

(54) MANUFACTURING METHOD FOR SHAPED OBJECT, SHAPING SYSTEM, AND SHAPING DEVICE

(71) Applicant: MIMAKI ENGINEERING CO., LTD., Nagano (JP)

(72) Inventors: Kunio Hakkaku, Nagano (JP); Yoshikazu Furukawa, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 263 days.

(21) Appl. No.: 16/221,619

(22) Filed: Dec. 17, 2018

(65) Prior Publication Data

US 2019/0184627 A1 Jun. 20, 2019

(30) Foreign Application Priority Data

Dec. 18, 2017 (JP) .............................. JP2017-242139

(51) Int. Cl.
*G06F 19/00* (2018.01)
*B29C 64/112* (2017.01)
(Continued)

(52) U.S. Cl.
CPC .......... *B29C 64/112* (2017.08); *B29C 64/209* (2017.08); *B29C 64/245* (2017.08);
(Continued)

(58) Field of Classification Search
CPC ... B29C 64/112; B29C 64/209; B29C 64/245; B29C 64/393; B29C 64/386; B33Y 10/00; B33Y 30/00; B33Y 50/02
See application file for complete search history.

(56) References Cited

U.S. PATENT DOCUMENTS

2016/0133050 A1* 5/2016 Sakurai ................. G06T 15/506
345/423
2016/0243761 A1* 8/2016 Okamoto .............. B29C 64/393
(Continued)

FOREIGN PATENT DOCUMENTS

JP 2015071282 4/2015
JP 2016210139 12/2016
(Continued)

OTHER PUBLICATIONS

"Office Action of Japan Counterpart Application", dated Jul. 6, 2021, with English translation thereof, p. 1-p. 14.

*Primary Examiner* — Zhipeng Wang
(74) *Attorney, Agent, or Firm* — JCIPRNET

(57) ABSTRACT

A manufacturing method for a shaped object for shaping the shaped object by layering a layer of a shaped object material, which is a material of the shaped object, in a layering direction set in advance, the manufacturing method including slice data generating stage of generating a plurality of pieces of slice data, each of which indicating a cross-section of the shaped object at positions different from each other in the layering direction; and shaping stage of shaping the shaped object by ejecting the shaped object material based on a plurality of pieces of slice data; where in at least either one of the slice data generating stage or the shaping stage, a process of applying fluctuation, in which a position seen from an outer side of the shaped object changes in an irregular form, to the shaped object is carried out.

14 Claims, 8 Drawing Sheets

(51) Int. Cl.
    *B29C 64/393* (2017.01)
    *B29C 64/209* (2017.01)
    *B29C 64/245* (2017.01)
    *B33Y 50/02* (2015.01)
    *B33Y 10/00* (2015.01)
    *B33Y 30/00* (2015.01)

(52) U.S. Cl.
    CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2016/0257120 A1* | 9/2016 | Yashima | B29C 64/112 |
| 2017/0100896 A1* | 4/2017 | Hakkaku | B33Y 30/00 |
| 2017/0120527 A1* | 5/2017 | Miller | B33Y 50/02 |
| 2017/0136706 A1* | 5/2017 | Hakkaku | B33Y 30/00 |
| 2018/0250881 A1* | 9/2018 | Hakkaku | B29C 64/264 |

FOREIGN PATENT DOCUMENTS

| | | | | |
|---|---|---|---|---|
| JP | 2017071211 | | 4/2017 | |
| JP | 2017094587 | | 6/2017 | |
| JP | 2017113986 | | 6/2017 | |
| JP | 2017196812 | | 11/2017 | |
| WO | WO-2015178443 A1 * | 11/2015 | ............ | B33Y 10/00 |

* cited by examiner

MANUFACTURING METHOD FOR SHAPED OBJECT, SHAPING SYSTEM, AND SHAPING DEVICE

CROSS REFERENCE TO RELATED APPLICATIONS

This application claims the priority benefit of Japanese Patent Application No. 2017-242139, filed on Dec. 18, 2017. The entirety of the above-mentioned patent application is hereby incorporated by reference herein and made a part of this specification.

TECHNICAL FIELD

The present disclosure relates to a manufacturing method for a shaped object, a shaping system, and a shaping device.

DESCRIPTION OF THE BACKGROUND ART

A shaping device (3D printer) that shapes a shaped object using an inkjet head is conventionally known (see e.g., Japanese Unexamined Patent Publication No. 2015-071282). In such shaping device, for example, the shaped object is shaped through a layered shaping method by overlapping a plurality of layers of ink formed using the inkjet head.

SUMMARY

When shaping a shaped object through the layered shaping method, the respective layers of ink are usually formed at a thickness set in advance. In this case, a step corresponding to the thickness of the layer of ink forms in a region inclined with respect to a layering direction in an outer peripheral surface of the shaped object, and the like. Furthermore, a layering stripe, which is a stripe formed by such step, may stand out depending on a shape of the shaped object. As a result, a quality of shaping may lower. Therefore, at a time of shaping of the shaped object, it is desired to suppress the layering stripe from standing out as much as possible. The present disclosure thus provides a manufacturing method for a shaped object, a shaping system, and a shaping device capable of overcoming such problem.

The inventors of the present disclosure conducted a thorough research on a method of suppressing the layering stripe of the shaped object from standing out. The inventors found out that the layering stripe is less likely to stand out by forming a continuous long step on a surface of the shaped object. Furthermore, as a method therefore, for example, shaping a shaped object while applying a fluctuation, in which a position seen from an outer side of the shaped object changes in an irregular form, to the shaped object is considered. The inventors of the present disclosure also found a characteristic necessary for obtaining the effect described above through further thorough research, and contrived the present disclosure.

To solve the problem described above, the present disclosure relates to a manufacturing method for a shaped object for shaping the shaped object by layering a layer of shaped object material, which is a material of the shaped object, in the layering direction set in advance, the manufacturing method including a slice data generating stage of generating a plurality of pieces of slice data, each of which indicating a cross-section of the shaped object at positions different from each other in the layering direction; and shaping stage of shaping the shaped object by ejecting the shaped object material based on the plurality of pieces of slice data; where in at least either one of the slice data generating stage or the shaping stage, a process of applying fluctuation, in which a position seen from an outer side of the shaped object changes in an irregular form, to the shaped object is carried out.

In such configuration, consideration is made to use data specifying an ejecting position, which is a voxel position to where the shaped object material is to be ejected, for example, for the slice data. The voxel position is, for example, a position of a unit for ejecting the shaped object material. Furthermore, the voxel position can also be considered as, for example, a position lined in a resolution of shaping set in advance, and the like. Moreover, in this case, in the shaping stage, for example, the shaped object material is ejected to the ejecting position specified in the respective slice data to form the layer of shaped object material corresponding to the respective slice data. According to such configuration, for example, the layering stripe can be appropriately prevented from standing out and the like in the shaped object. Furthermore, for example, a high quality shaped object thus can be more appropriately manufactured. In the process of applying fluctuation to the shaped object, the fluctuation is preferably applied at least to an outer edge portion of the layer of shaped object material. According to such configuration, for example, the fluctuation that makes the layering stripe less stand out can be appropriately applied to the shaped object.

Moreover, as a method of applying fluctuation, for example, consideration is made to use data in which at least one part of a contour is changed instead of using data simply indicating a shape of the cross-section of the shaped object to shape as is for the data to use at the time of shaping. In this case, for example, an intermediate data generating process and a data converting process are carried out in the slice data generating stage. The intermediate data generating process is a process of generating the intermediate data, which is data used for the generation of the slice data, and generates a plurality of pieces of intermediate data each indicating the shape of the cross-section of the shaped object at positions different from each other in at least the layering direction based on the shaped object data, which is data indicating the entire shaped object. The data converting process is a process of generating the respective slice data based on the respective intermediate data, and generates a plurality of pieces of slice data while changing a contour, which is a portion corresponding to an outer peripheral surface of the shaped object when generating the slice data from the intermediate data of at least one part. Furthermore, in this case, in the data converting process, the slice data in which the contour is different from the intermediate data is generated by differing an arrangement of the ejecting positions in an outermost periphery from the corresponding intermediate data for the slice data of at least one part.

When configured in such manner, for example, the slice data in which the contour is changed can be used instead of using the slice data simply indicating the shape of the cross-section of the shaped object as is with respect to shape. In this case, for example, consideration is made to change the contour of the slice data, and the like so that the layering stripes are less likely to stand out. According to such configuration, for example, the layering stripe can be appropriately prevented from standing out and the like in the shaped object. Furthermore, in such configuration, for example, data specifying the ejecting position in the same format as the slice data, and the like can be used for the intermediate data. Furthermore, the intermediate data can also be considered as, for example, data corresponding to the slice data simply indicating the shape of the cross-section of the shaped object as is with respect to shape. Moreover, in the data converting process, the change (adjustment) of the contour may be carried out with respect to all the slice data.

The layering stripe is assumed to particularly stand out when the outer edge portion (outer peripheral portion) of the layer of shaped object material is overlapped at the same position (same position in a plane orthogonal to the layering direction). Thus, in this case, the contour of the slice data is preferably changed so that the range in which the outer edge portion of the layer of shaped object material overlaps at the same position reduces. More specifically, for example, when a portion where a position in the plane orthogonal to the layering direction of the contour of the slice data is the same as the slice data adjacent in the layering direction is defined as a step overlapping portion, consideration is made to change the contour of the slice data to reduce the step overlapping portion than when using the slice data in which the contour is the same as the intermediate data in the data converting process. When referring to reducing the step overlapping portion, for example, this means reducing the portion overlapping at the same position in the outer edge portion of the continuing plurality of layers of shaped object material. According to such configuration, for example, the range in which a step of a height worth the plurality of layers of shaped object material is formed can be reduced than when the fluctuation is not applied. Moreover, for example, the layering stripe can be more appropriately prevented from standing out.

In such configuration, when referring to carrying out the change of contour of the slice data, for example, this means generating the slice data in which the contour is different from the intermediate data. Furthermore, when the contour is the same between the intermediate data and the slice data, this may mean that the same contour is indicated based on a specification of each data. For example, when a resolution is different between the intermediate data and the slice data, and the like, the same contour may be indicated in view of the influence of the difference in resolution. Furthermore, the contour is preferably suppressed from standing out as much as possible for the respective layer of shaped object material to suppress the layering stripe from standing out. In this case, for example, consideration is made to blur the contour, and the like by applying fluctuation to the contour of the respective slice data. Applying the fluctuation to the contour of the slice data means, for example, changing the contour of the slice data so that fluctuation is applied to the portion corresponding to the contour of the slice data in the shaped object. Furthermore, more specifically, for example, consideration is made to carry out the change of contour of the slice data, and the like so that fluctuation is increased compared to when using the slice data in which the contour is the same as the intermediate data in the data converting process. According to such configuration, for example, the layering stripes can be more appropriately prevented from standing out.

Furthermore, in the shaping stage, for example, consideration is made to shape the shaped object by causing the ejection head that ejects the shaped object material to carry out a main scanning operation. In this case, the main scanning operation is, for example, an operation of ejecting the shaped object material while relatively moving in a main scanning direction set in advance with respect to the shaped object being shaped. Furthermore, in this case, a direction orthogonal to the main scanning direction and the layering direction can be defined as, for example, a sub-scanning direction. In this case, in the data converting process, for example, consideration is made to carry out the change of contour of the slice data on at least some slice data so that the ejecting positions of one part configuring the contour are shifted in at least one of either the main scanning direction or the sub-scanning direction compared to the slice data in which the contour is the same as the corresponding intermediate data. According to such configuration, for example, the contour of at least some slice data can be appropriately differed from the contour of the corresponding intermediate data. Furthermore, in this case, the manner of changing the contour of the slice data can be considered as, for example, a method of shifting some voxel positions configuring an outer edge portion of the slice data in the main scanning direction or the sub-scanning direction, and the like. Furthermore, in this case, for example, consideration is made to select the voxel position to shift a position for every predetermined number of voxel positions along the outer edge (outer periphery) of the slice data. Furthermore, in this case, consideration is made to have the shift amount of the voxel position to for example, one to two voxel positions (e.g., by one voxel position).

Furthermore, in the data converting process, for example, consideration is made to use a predetermined mask for data conversion to change the contour of the slice data, and the like. More specifically, in this case, for example, the slice data in which the contour is different from the intermediate data is generated by applying a mask for changing a specification of the ejecting position with a pattern set in advance on the intermediate data of at least one part. Furthermore, in this case, for example, consideration is made to use the mask for changing the specification of the ejecting position to eject a support material in place of the shaped object material to the ejecting position of one part, and the like for the mask. The support material is, for example, a material of the support layer that supports the shaped object being shaped. Furthermore, in this case, the support material is further ejected, and the shaping of the shaped object is carried out in the shaping stage. According to such configuration, for example, the change of contour of the slice data can be appropriately carried out.

Furthermore, in the shaping stage, for example, consideration is made to cause the ejection head to carry out a plurality of main scanning operations at a time of forming the layer of shaped object material corresponding to one piece of slice data. In this case, in the contour changing process, consideration is made to change the contour of the slice data so that the ejecting positions in some main scanning operations are shifted in the main scanning direction. More specifically, in this case, in the contour changing process, for example, consideration is made to generate the slice data so that the position in the main scanning direction is shifted compared to the ejecting position specified in the intermediate data for the ejecting position to where the shaped object material is ejected in some main scanning operations of the plurality of main scanning operations. According to such configuration, for example, the change of contour of the slice data can be appropriately carried out.

Furthermore, consideration is also made to, for example, apply fluctuation through the process in the shaping stage. In this case, for example, consideration is made to differ a reference position of some main scanning operations from the other main scanning operations for the reference position to become a reference of the ejecting position of ejecting the shaped object material in the main scanning operation. In this case, the reference position is, for example, the reference position in the main scanning direction. More specifically, in this case, consideration is made to set the reference position set with respect to some main scanning operations of the plurality of main scanning operations so that the position in the main scanning direction is shifted with respect to the reference position set with respect to the other main scanning operations. Even when configured in such manner, for example, the fluctuation can be appropriately applied with respect to the outer surface shape of the shaped object formed according to the slice data. Thus, for example, the layering stripe can be appropriately prevented from standing out.

Furthermore, consideration is made to carry out the application of fluctuation to the shaped object for, for example, a purpose other than the purpose of suppressing the layering stripe from standing out. In this case, for example, consideration is made to have a texture of the surface of the shaped object to a matte tone by changing the contour of the slice data, and the like. Furthermore, more specifically, in this case, for example, the contour of the slice data of at least one part is differed from the corresponding intermediate data so that at least one part of the surface of the shaped object has a matte tone in the data converting process. According to such configuration, for example, the shaped object having a surface of a matte tone can be appropriately manufactured, as necessary.

Furthermore, consideration is also made to use a shaping system, a shaping device, and the like having features similar to the above, for example, for the configuration of the present disclosure. In this case as well, for example, effects similar to above can be obtained.

According to the present disclosure, for example, a high quality shaped object can be more appropriately manufactured.

BRIEF DESCRIPTION OF THE DRAWINGS

FIG. 1 including

FIG. 1A shows one example of a configuration of the shaping system 10. FIG. 1B shows one example of a configuration of a main part of a shaping device 12. FIG. 1C shows one example of a configuration of a head unit 102.

FIG. 2 including FIG. 2A shows one example of a configuration of the shaped object 50 shaped in the present example. FIG. 2B is a flowchart showing one example of an operation of generating the slice data in a control PC 14.

FIG. 3 including FIG. 3A is a view describing a state of a cross-section of the shaped object 50 when the shaped object 50 is shaped without changing the contour. FIG. 3B is a view describing an outer appearance of the shaped object 50.

FIG. 4 including FIG. 4A is a view describing the outer appearance of the shaped object 50 when the change of contour is not carried out with respect to the slice data. FIG. 4B shows one example of the change of contour carried out with respect to the slice data.

FIG. 5 including FIG. 5A shows one example of a configuration of an intermediate data. FIG. 5B shows one example of a mask to be applied to the intermediate data.

FIG. 6 including FIG. 6A is a view describing the operation of applying the mask in further detail. FIG. 6B is a view describing an effect of applying the mask in further detail.

FIG. 7 including FIG. 7A schematically shows a voxel configuring one part of the shaped object 50. FIG. 7B shows one example of a state of a final shaped object in which shaping is completed. FIG. 7C is a view describing a variant of a manner of forming a protective region 156 in a matte tone.

FIG. 8 including FIG. 8A schematically shows the voxel configuring one part of the shaped object 50. FIG. 8B shows one example of a state in the vicinity of a coloring region 154 after a support layer 52 is removed.

DETAILED DESCRIPTION OF EMBODIMENTS

Figure 1A:
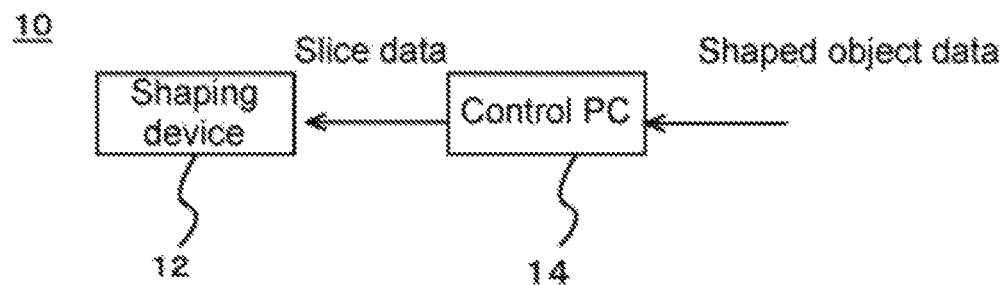
FIGS. 1A to 1C are views showing one example of a shaping system 10 that executes a shaping method according to one embodiment of the present disclosure.
Figure 1B:
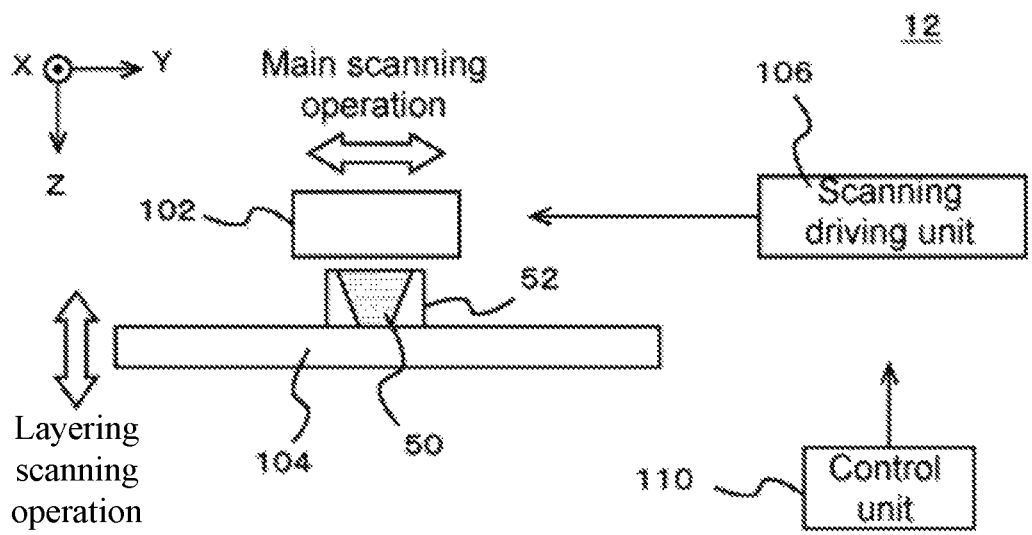
Figure 1C:
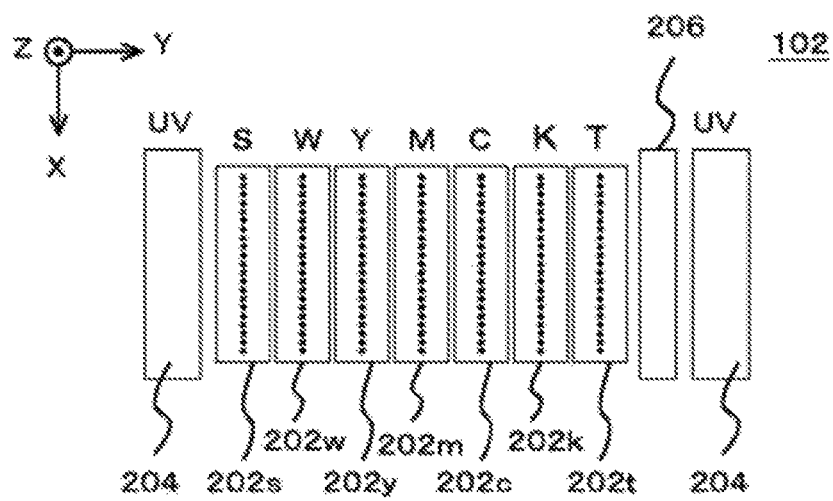

Hereinafter, an embodiment according to the present disclosure will be described with reference to the drawings. FIG. 1A to 1C show one example of a shaping system 10 that executes a shaping method according to one embodiment of the present disclosure. FIG. 1A shows one example of a configuration of the shaping system 10. In the present example, the shaping system 10 is a shaping system that shapes a stereoscopic shaped object, and includes a shaping device 12 and a control PC 14.

The shaping device 12 is a device that executes a shaping of the shaped object, and shapes the shaped object according to a control of the control PC 14. More specifically, the shaping device 12 is a full color shaping device that can shape a shaped object colored in full color, and receives data indicating the shaped object to shape from the control PC 14 and shapes the shaped object based on such data. Furthermore, in the present example, the shaping device 12 receives slice data indicating a cross-section of the shaped object as the data indicating the shaped object, and carries out the shaping of the shaped object based on the slice data.

The control PC 14 is a computer (host PC) that controls an operation of the shaping device 12. The control PC 14 generates the slice data indicating the shaped object to be shaped by the shaping device 12, and provides the slice data to the shaping device 12. The control PC 14 thereby controls an operation of shaping by the shaping device 12. More specifically, in the present example, the control PC 14 externally receives shaped object data indicating the shaped object 50 to shape, and generates the slice data based on the shaped object data. In this case, data indicating the entire shaped object 50 in a predetermined format, for example, is used for the shaped object data. Data of versatile format, and the like that does not depend on the model and the like of the shaping device 12 can be suitably used for the shaped object data. An operation of generating the slice data will be described in further detail later.

In the present example, the shaping system 10 is configured by a plurality of devices, the shaping device 12 and the control PC 14. However, in a variant of the shaping system 10, the shaping system 10 may be configured by one device. In this case, for example, consideration is made to configure the shaping system 10 with one shaping device 12 having a function of the control PC 14. Furthermore, in a variant of the configuration of the shaping system 10, consideration is made to execute some of the functions of the control PC 14 described above and below in the shaping device 12.

Next, a specific configuration of the shaping device 12 will be described. FIG. 1B shows one example of a configuration of a main part of the shaping device 12. In the present example, the shaping device 12 is a shaping device that shapes a stereoscopic shaped object 50, and includes a head unit 102, a shaping table 104, a scanning driving unit 106, and a control unit 110. Other than the points described below, the shaping device 12 may have a configuration same as or similar to a known shaping device. More specifically, other than the points described below, the shaping device 12 may have a configuration same as or similar to, for example, a known shaping device that carries out shaping by ejecting a droplet of ink to become a material of the shaped object 50 using an inkjet head. Furthermore, other than the illustrated configuration, the shaping device 12 may also include, for example, various types of configurations necessary for shaping and the like of the shaped object 50. Moreover, in the present example, the shaping device 12 is a shaping device (3D printer) that shapes a stereoscopic shaped object 50 through a layered shaping method. In this case, the shaped object 50 is, for example, a stereoscopic three-dimensional structural object. The layered shaping method is, for example, a method of shaping the shaped object 50 by overlapping a plurality of layers. Furthermore, in the present example, the layered shaping method is an example of a method of carrying out shaping by layering a layer of shaped object material, which is the material of the shaped object, in a layering direction set in advance.

The head unit 102 is a portion that ejects the material of the shaped object 50. Furthermore, in the present example, ink is used for the material of the shaped object 50. In this case, the ink is, for example, a liquid having functionality. Furthermore, in the present example, the ink is an example of the shaped object material. The ink can be considered as, for example, a liquid ejected from the inkjet head. More specifically, the head unit 102 ejects ink, which cures according to a predetermined condition, from a plurality of inkjet heads as the material of the shaped object 50. The landed ink is then cured, thus forming each layer configuring the shaped object 50 in an overlapping manner, and the shaped object is shaped through the layered shaping method. Furthermore, an ultraviolet curable ink (UV ink) that cures from a liquid state by irradiation of an ultraviolet light is used for the ink.

Furthermore, the head unit 102 further ejects a support material (support ink), which is a material of a support layer 52, in addition to the material of the shaped object 50. The head unit 102 thereby forms the support layer 52, as necessary, at a periphery of the shaped object 50. The support layer 52 is, for example, a layered structural object that supports the shaped object 50 by surrounding an outer periphery of the shaped object 50 being shaped. The support layer 52 is formed as necessary at a time of shaping of the shaped object 50, and removed after the completion of shaping. Consideration is made to use an ink, and the like that can be dissolved and removed with water after the completion of shaping, for example, for the support material.

The shaping table 104 is a table-like member that supports the shaped object 50 being shaped, and is arranged at a position facing the inkjet head in the head unit 102, and has the shaped object 50 being shaped mounted on an upper surface. Furthermore, in the present example, the shaping table 104 has a configuration in which at least the upper surface is movable in a layering direction (Z direction in the figure), and moves at least the upper surface with an advancement in the shaping of the shaped object 50 by being driven by the scanning driving unit 106. In this case, the layering direction is, for example, a direction in which the material of shaping is layered in the layered shaping method. More specifically, in the present example, the layering direction is a direction orthogonal to a main scanning direction (Y direction in the figure) and a sub-scanning direction (X direction in the figure) set in advance in the shaping device 10.

The scanning driving unit 106 is a driving unit that causes the head unit 102 to carry out a scanning operation of relatively moving with respect to the shaped object 50 being shaped. In this case, relatively moving with respect to the shaped object 50 being shaped means, for example, relatively moving with respect to the shaping table 104. Furthermore, when referring to causing the head unit 102 to carry out the scanning operation, this means, for example, causing the inkjet head in the head unit 102 to carry out the scanning operation. Moreover, in the present example, the scanning driving unit 106 causes the head unit 102 to carry out the main scanning operation (Y scanning), the sub-scanning operation (X scanning), and the layering scanning operation (Z scanning).

The main scanning operation is, for example, an operation of ejecting ink while relatively moving in the main scanning direction with respect to the shaped object 50 being shaped. In the present example, the scanning driving unit 106 causes the head unit 102 to carry out the main scanning operation by fixing a position of the shaping table 104 in the main scanning direction and moving a position of the head unit 102 side. Furthermore, the scanning driving unit 106 may move the shaped object 50 side by, for example, fixing the position of the head unit 102 in the main scanning direction and for example, moving the position of shaping table 104.

The sub-scanning operation is, for example, an operation of relatively moving with respect to the shaped object 50 being shaped in the sub-scanning direction orthogonal to the main scanning direction. More specifically, the sub-scanning operation is, for example, an operation of relatively moving with respect to the shaping table 104 in the sub-scanning direction by a feed amount set in advance. In the present example, the scanning driving unit 106 causes the head unit 102 to carry out the sub-scanning operation by fixing the position of the head unit 102 in the sub-scanning direction and moving the position of shaping table 104 between the main scanning operations. Furthermore, the scanning driving unit 106 may cause the head unit 102 to carry out the sub-scanning operation by fixing the position of the shaping table 104 in the sub-scanning direction and moving the position of the head unit 102.

The layering scanning operation is, for example, an operation of relatively moving the head unit 102 in the layering direction with respect to the shaped object 50 being shaped. Furthermore, the scanning driving unit 106 adjusts the relative position of the inkjet head with respect to the shaped object 50 being shaped in the layering direction by causing the head unit 102 to carry out the layering scanning operation in accordance with the advancement of the operation of shaping. More specifically, the scanning driving unit 106 fixes the position of the head unit 102 in the layering direction and moves the shaping table 104 in the layering scanning operation of the present example. The scanning driving unit 106 may fix the position of the shaping table 104 in the layering direction and move the head unit 102.

The control unit 110 is, for example, a CPU of the shaping device 12, and controls the operation of shaping of the shaped object 50 by controlling each unit of the shaping device 12. Furthermore, in the present example, the control unit 110 controls each unit of the shaping device 12 based on the slice data received from the control PC 14. In this case, the control unit 110 controls an operation of each inkjet head in the head unit 102, for example, to cause each inkjet head to eject the ink to use for the shaping of the shaped object. According to the present example, the shaped object 50 can be appropriately shaped.

Next, the configuration of the head unit 102 in the shaping device 12 will be described in further detail. FIG. 1C shows one example of a configuration of the head unit 102. In the present example, the head unit 102 includes a plurality of inkjet heads, a plurality of ultraviolet light sources 204, and a flattening roller 206. As shown in the figure, an inkjet head 202s, an inkjet head 202w, an inkjet head 202y, an inkjet head 202m, an inkjet head 202c, an inkjet head 202k, and an inkjet head 202t are provided for the plurality of inkjet heads. Such plurality of inkjet heads are, for example, arranged side by side in the main scanning direction with the positions in the sub-scanning direction aligned. Furthermore, each inkjet head includes a nozzle row, in which a plurality of nozzles are lined in a predetermined nozzle row direction, on a surface facing the shaping table 104. Moreover, in the present example, the nozzle row direction is a direction parallel to the sub-scanning direction.

Among such inkjet heads, the inkjet head 202s is an inkjet head that ejects the support material. For example, a known material for the support layer can be suitably used for the support material. The inkjet head 202w is an inkjet head that ejects white (W) ink. Furthermore, in the present example, the white ink is an example of a light reflective ink, and for example, is used when forming a region (light reflecting region) having a property of reflecting light in the shaped object 50. As will be described later, in the present example, an interior (interior region) of the shaped object 50 is also formed using the white ink. Thus, the white ink can be assumed as also being used as the ink for shaping the interior of the shaped object 50.

The inkjet head 202y, the inkjet head 202m, the inkjet head 202c, and the inkjet head 202k (hereinafter referred to as inkjet heads 202y to 202k) are inkjet heads for coloring used at the time of shaping the colored shaped object 50. More specifically, the inkjet head 202y ejects a yellow (Y) ink. The inkjet head 202m ejects a magenta (M) ink. The inkjet head 202c ejects a cyan (C) ink. The inkjet head 202k ejects a black (K) ink. In the present example, each color of YMCK is an example of a process color used in full color representation by a subtractive color mixing method. The inkjet head 202t is an inkjet head that ejects a clear ink (transparent ink). The clear ink is, for example, a colorless transparent (T) clear ink.

The plurality of ultraviolet light sources 204 are light sources (UV light sources) for curing the ink, and generate an ultraviolet light for curing the ultraviolet curable ink. Moreover, in the present example, each of the plurality of ultraviolet light sources 204 is arranged on one end side and the other end side in the main scanning direction in the head unit 102 so as to sandwich an arrangement of the inkjet heads in between. For example, UVLED (ultraviolet LED) and the like can be suitably used for the ultraviolet light source 204. Furthermore, consideration is also made to use a metal halide lamp, a mercury lamp, and the like for the ultraviolet light source 204. The flattening roller 206 is a flattening means for flattening the layer of ink formed during the shaping of the shaped object 50. The flattening roller 206, for examples, makes contact with a surface of the layer of ink and removes one part of the ink before being cured to flatten the layer of ink at the time of the main scanning operation.

The layer of ink configuring the shaped object 50 can be appropriately formed by using the head unit 102 having the above configuration. Furthermore, the shaped object 50 can be appropriately shaped by forming a plurality of layers of ink in an overlapping manner.

A specific configuration of the head unit 102 is not limited to the configuration described above, and can be variously modified. For example, the head unit 102 may further include an inkjet head for ink other than the above. In this case, for example, consideration is made to use an inkjet head that ejects the shaping material ink (Mo ink), and the like. The shaping material ink is, for example, an ink dedicated to shaping used to shape the interior of the shaped object 50. The head unit 102 may further include an inkjet head for a color other than the above for the inkjet head for coloring. A manner of arranging the plurality of inkjet heads in the head unit 102 can also be variously modified. For example, the position in the sub-scanning direction of some inkjet heads may be shifted from the other inkjet heads.

Figure 2A:
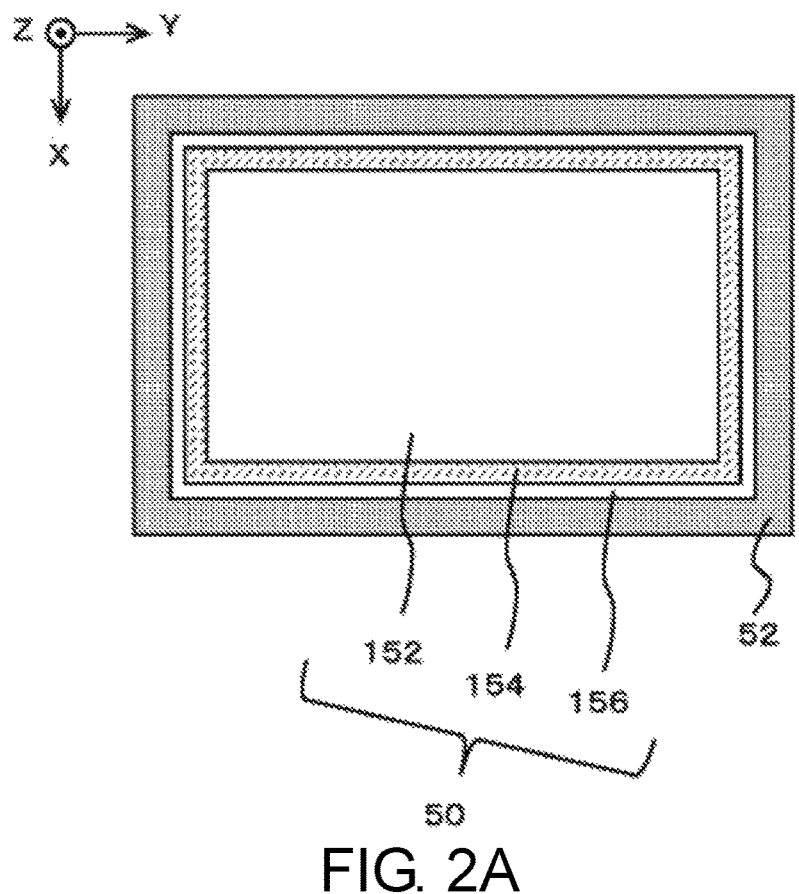
FIGS. 2A to 2B are views showing one example of a detailed configuration of a shaped object 50 and an operation of generating a slice data.
Figure 2B:
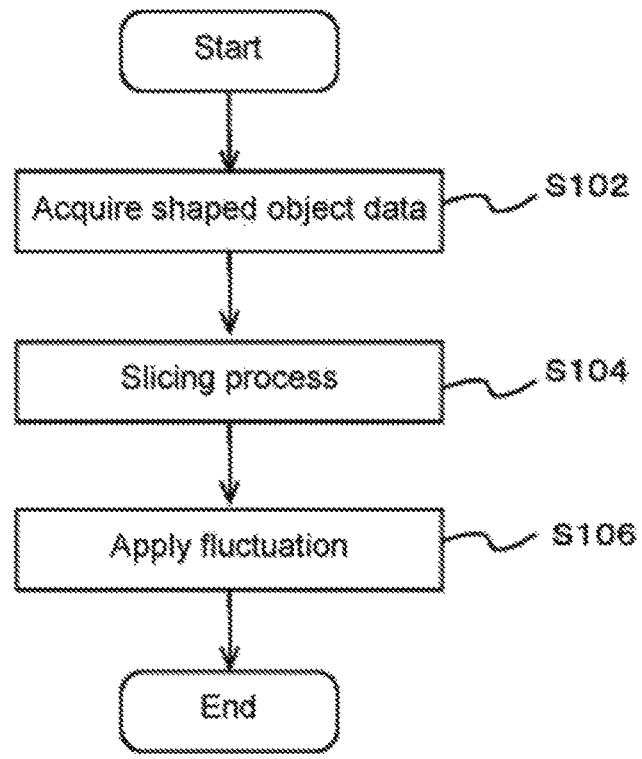

Next, a more detailed configuration of the shaped object 50, an operation of generating the slice data, and the like will be described in more detail. FIGS. 2A to 2B show one example of the detailed configuration of the shaped object 50 and the operation of generating the slice data. FIG. 2A is a view showing one example of a configuration of the shaped object 50 to shape in the present example, and shows one example of a configuration of a X-Y cross-section, which is a cross-section of the shaped object 50 orthogonal to the layering direction (Z direction), with the support layer 52. In this case, the configurations of a Z-X cross-section and a Z-Y cross-section of the shaped object 50 perpendicular to the Y direction and the Z direction also have a similar configuration.

In the present example, the shaping device 12 (see FIG. 1) shapes the colored shaped object 50 using the inkjet heads 202y to 202k (see FIG. 1) and the like. In this case, the shaped object 50 in which at least the surface is colored is shaped as the shaped object 50. When referring to the surface of the shaped object 50 being colored, for example, this means that at least one part of the region where hue can be visually recognized from an outside in the shaped object 50 is colored. Furthermore, in this case, the shaping device 12 shapes, for example, the shaped object 50 including an interior region 152, a coloring region 154, and a protective region 156 as shown in the figure. The support layer 52 is also formed at the periphery of the shaped object 50, and the like, as necessary.

The interior region 152 is a region configuring the interior of the shaped object 50. Furthermore, the interior region 152 can also be considered as, for example, a region configuring the shape of the shaped object 50. In the present example, the shaping device 12 forms the interior region 152 using the white ink ejected from the inkjet head 202w (see FIG. 1). The region also serving as the light reflecting region is thereby formed as the interior region 152. In this case, the light reflecting region is, for example, a region having light reflecting property for reflecting the light entering from an outer side of the shaped object 50 through the coloring region 154, and the like.

The coloring region 154 is a region to be colored by the ink for coloring ejected from the inkjet heads 202y to 202k. In the present example, the shaping device 12 forms the coloring region 154 at a periphery of the interior region 152 using the ink for coloring ejected from the inkjet heads 202y to 202k and the clear ink ejected from the inkjet head 202t (see FIG. 1). In this case, for example, various colors can be represented by adjusting an ejection amount of ink for coloring of each color to each position. Furthermore, the clear ink is used to complement the change in the amount of ink for coloring (e.g., ejection amount per unit volume is 0% to 100%) caused by a difference in color to a constant amount. According to such configuration, for example, each position of the coloring region 154 can be appropriately colored with a desired color.

The protective region 156 is a transparent region for protecting the outer surface of the shaped object 50. In the present example, the shaping device 12 forms the protective region 156 at a periphery of the coloring region 154 using the clear ink ejected from the inkjet head 202t. Furthermore, the head unit 102 forms the protective region 156 so as to cover an outer side of the coloring region 154 using a transparent material. The shaped object 50 in which the surface is colored can be appropriately formed by forming each region in the above manner.

In a variant of the configuration of the shaped object 50, a specific configuration of the shaped object 50 may be differed from the above. More specifically, in this case, for example, consideration is made to form a light reflecting region and an interior region as different regions rather than forming the interior region 152 also serving as the light reflecting region. In this case, the interior region 152 can be formed using an arbitrary ink other than the support material. Furthermore, the light reflecting region is formed at a periphery of the interior region 152 using, for example, the white ink. Moreover, consideration is also made to omit some regions in the shaped object 50. In this case, for example, consideration is made to omit the protective region 156, and the like. Furthermore, consideration is also made to further form a region other than the above in the shaped object 50. In this case, for example, consideration is made to form a separating region between the interior region 152 and the coloring region 154, and the like. The separating region is, for example, a transparent region (transparent layer) for preventing the white ink on an inner side of the coloring region 154 and the ink configuring the coloring region 154 from mixing. In this case, the shaping device 12 forms, for example, the separating region on the inner side of the coloring region 154 using the clear ink ejected from the inkjet head 202t.

The operation of generating the slice data in the present example will now be described in further detail. As described above, in the present example, a generation of the slice data is carried out by the control PC 14 (see FIG. 1). In this case, the operation of generating the slice data in the control PC 14 is one example of an operation of a slice data generating stage. Furthermore, in this case, the control PC 14 generates a plurality of pieces of slice data each indicating a cross-section of the shaped object 50 at positions different from each other in the layering direction. More specifically, in the present example, the slice data is data specifying the ejecting position of the ink of each color used for shaping, and indicates the shape and color of the cross-section of the shaped object 50 by specifying the ejecting position of the ink of each color. In this case, the ejecting position is, for example, a voxel position where the ink is to be ejected. The voxel position is, for example, a position of a voxel, which is a unit for ejecting the ink. Furthermore, the voxel is, for example, a three-dimensional pixel, which is a unit of shaping determined according to a resolution of shaping. Furthermore, the voxel position can also be considered as, for example, a position lined in the resolution of shaping set in advance, and the like.

In the present example, the shaping device 12 (see FIG. 1) carries out the shaping of the shaped object 50 by ejecting the ink of each color based on the plurality of pieces of slice data received from the control PC 14. In this case, the operation of shaping carried out in the shaping device 12 is an example of an operation of a shaping stage. Furthermore, the shaping device 12 foul's the layer of ink configuring each position of the shaped object 50 based on the slice data indicating the cross-section of each position in the shaped object 50. More specifically, in the present example, the shaping device 12 forms the layer of ink corresponding to the respective slice data by ejecting the ink of each color to the ejecting position specified in the respective slice data. The layer of ink is thereby layered, and the shaped object 50 is shaped.

As described above, in the present example, the plurality of pieces of slice data are generated based on shaped object data indicating the entire shaped object 50. Furthermore, data, each indicating the cross-section of the shaped object 50 at positions different from each other in the layering direction, are generated as the plurality of pieces of slice data. In this case, however, instead of generating the slice data reflecting the shape indicated by the shaping data as is, the slice data in which a change (adjustment) of a contour is carried out through a predetermined method is generated. In this case, the contour is, for example, a portion corresponding to an outer peripheral surface of the shaped object. More specifically, in the present example, the generation of the slice data is carried out according to the operation of the flowchart shown in FIG. 2B.

FIG. 2B is a flowchart showing one example of an operation of generating the slice data in the control PC 14. In the present example, the control PC 14 first acquires the shaped object data through, for example, a network, a storage medium, and the like (S102). The intermediate data, which is data used for the generation of the slice data, is generated by carrying out a slicing process with respect to the shaped object data (S104). In this case, an operation of step S104 is an example of an operation of an intermediate data generating process. The slicing process is, for example, a process of setting a position of the cross-section at a constant interval in the layering direction, and generating data indicating a cross-section of the shaped object indicated by the shaped object data with respect to the position of each cross-section.

Furthermore, in the present example, data specifying the ejecting position in the same format as the slice data is used for the intermediate data. Moreover, for example, a process same as or similar to when generating the slice data through a known method is carried out for the slicing process. Generating the slice data through the known method means, for example, generating the slice data without changing the contour, and the like, which will be described in further detail later. Thus, the intermediate data can be considered as, for example, data corresponding to the slice data of when the contour is not changed.

More specifically, in the present example, the control PC 14 sets a region corresponding to each region (interior region 152, coloring region 154, and protective region 156) of the shaped object 50 within the cross-section, and specifies the ejecting position of the ink of each color in the process of generating the intermediate data. Furthermore, in this case, for example, a halftone process, and the like are carried out same as or similar to when generating the slice data through the known method to specify the ejecting position of the ink of each color in the region corresponding to the coloring region 154. Thus, in step S104, the control PC 14 generates a plurality of pieces of intermediate data each indicating a shape of the cross-section and a color of each position of the cross-section of the shaped object at positions different from each other in the layering direction based on the shaped object data.

In this case, the intermediate data can be considered as, for example, data indicating at least the shape of the cross-section of the shaped object at positions different from each other in the layering direction, and the like. Furthermore, the intermediate data can also be considered as, for example, data corresponding to the slice data simply indicating the shape of the cross-section of the shaped object 50 as is with respect to the shape. Furthermore, when referring to the slice data simply indicating the shape of the cross-section of the shaped object 50 as is with respect to the shape, this means, for example, indicating the shape of the cross-section of the shaped object 50 as is when focusing on a matter related to the shape of the shaped object 50 of the matters indicated by the slice data. Moreover, when referring to indicating the shape of the cross-section of the shaped object 50 as is, this means, for example, indicating the shape corresponding to the cross-section of the shaped object 50 indicated by the shaped object data in a state the change in resolution according to the resolution of shaping and the like is appropriately carried out.

In the present example, a process of applying fluctuation with respect to the generated intermediate data is carried out to generate the slice data (S106). In this case, fluctuation is, for example, change in position seen from the outer side of the shaped object 50 in an irregular form. Furthermore, generating the slice data by carrying out the process of applying fluctuation means, for example, generating the slice data in which change is made such that fluctuation is applied to the shaped object 50 to be shaped. Applying fluctuation to the shaped object 50 means, for example, applying fluctuation to the outer surface shape of the shaped object. More specifically, in the present example, for example, the contour of the intermediate data is changed, and the slice data in which the contour is different from the intermediate data is generated. In this case, changing the contour means, for example, changing an arrangement of the ejecting positions configuring an outermost periphery of the cross-section. More specifically, in this case, for example, the contour of the slice data is changed by using a predetermined mask for data conversion and applying the mask with respect to at least some intermediate data. In this case, for example, consideration is made to use a mask for changing the specification of the ejecting position with a pattern set in advance. According to such configuration, for example, when generating the corresponding slice data from at least some intermediate data, the respective slice data can be generated based on the respective intermediate data while changing the contour. Furthermore, the contour of the slice data may be changed through a method other than the method of applying the mask.

In the present example, the operation of step S106 is an example of an operation of a data converting process. Furthermore, in FIG. 2B, an operation of when starting the generation of the slice data after generating the intermediate data corresponding to the positions of all the cross-sections is illustrated with respect to the operation of generating the slice data, for the sake of convenience of illustration and explanation. However, in a variant of the operation of generating the slice data, the generation of the intermediate data and the generation of the slice data may be carried out in parallel. In this case, the generation of the slice data corresponding to the generated intermediate data is carried out in parallel while sequentially generating the intermediate data corresponding to the position of the respective cross-section.

Furthermore, when the contour is the same between the intermediate data and the slice data, this may mean that the same contour is indicated based on the specification of each data. For example, in the present example, for example, data indicating the shape of the cross-section and the like with the same specification as the slice data is used for the intermediate data. In this case, when referring to the contour being the same between the intermediate data and the slice data, this means that the shape indicated by each data is the same. Furthermore, for example, consideration is made to use data in which the resolution, and the like are different from the slice data for the intermediate data. In this case, when referring to the contour being the same between the intermediate data and the slice data, this may mean that for example, the same contour is indicated in view of the influence of the difference in resolution.

The operation of the generation of the slice data carried out in step S106 can be considered as, for example, an operation of differing the arrangement of the ejecting positions in an outermost periphery from the corresponding intermediate data, and generating the slice data in which the contour is different from the intermediate data. When configured in such manner, for example, the slice data in which the contour is changed can be appropriately used instead of using the slice data simply indicating the shape of the cross-section of the shaped object as is with respect to shape. In this case, for example, consideration is made to change the contour of the slice data, and the like so that layering stripes are less likely to stand out. According to such configuration, for example, the layering stripes thus can be appropriately prevented from standing out, and the like in the shaped object 50. Furthermore, for example, a high quality shaped object can be more appropriately manufactured. In this case, consideration is made to change the contour with respect to all the slice data. Furthermore, change of contour and the like carried out at the time of generating the slice data will be described in further detail later.

Figures 3A, 3B:
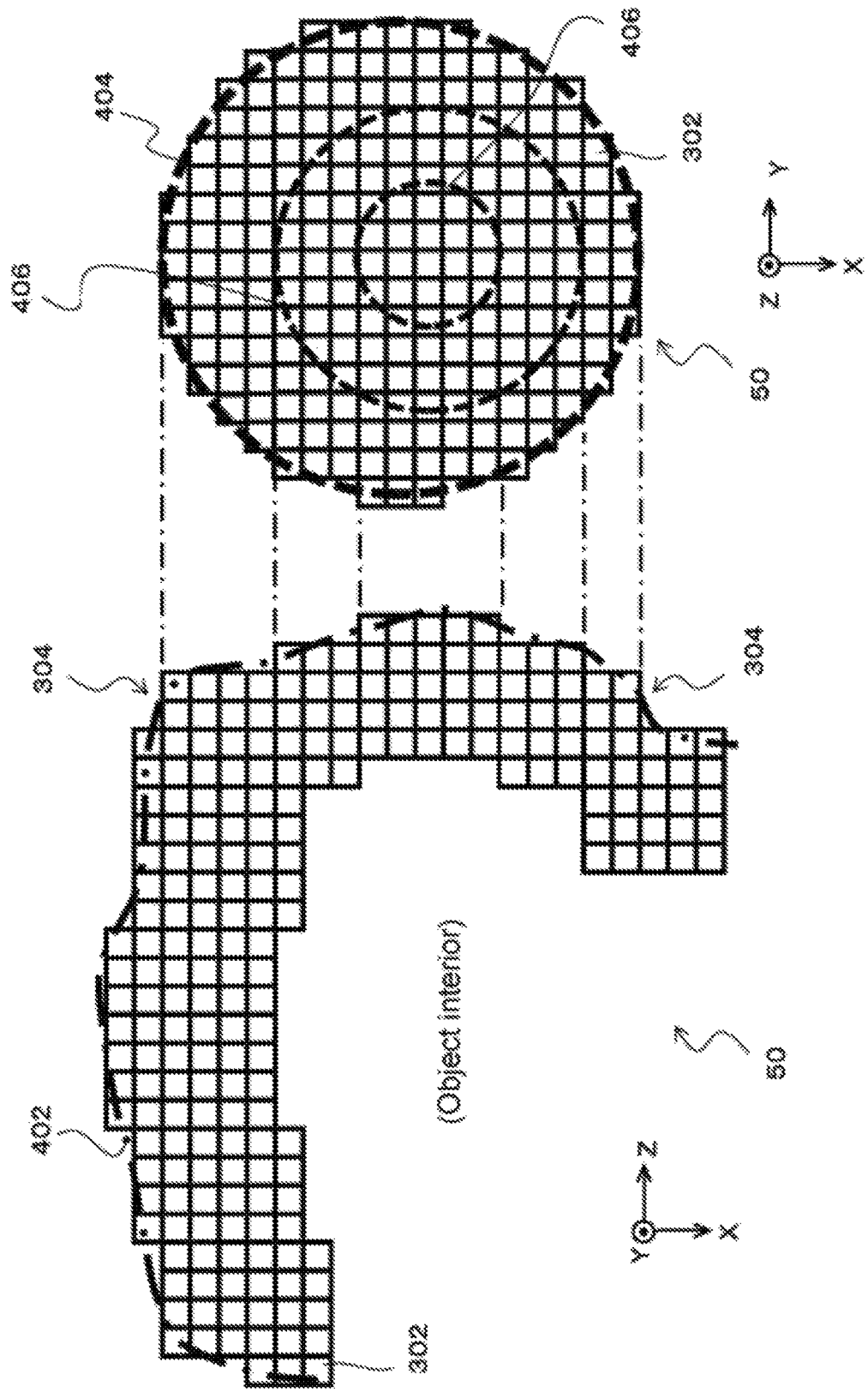
FIGS. 3A to 3B are views describing a problem that arises when the shaped object 50 is shaped without changing a contour.

FIGS. 3 and 4 are views describing the change of contour carried out at the time of generating the slice data in further detail. FIGS. 3A to 3B are views describing the problem that arises when the shaped object 50 is shaped without changing the contour. FIG. 3A is a view describing a state of the cross-section of the shaped object 50 when the shaped object 50 is shaped without changing the contour, and shows one example of the cross-section of the shaped object 50 by a plane orthogonal to the main scanning direction (Y direction), focusing on the relationship between the resolution of shaping and the outer surface shape of the shaped object 50. FIG. 3B is a view describing an outer appearance of the shaped object 50, and shows one example of a state of the shaped object 50 when the shaped object 50, which cross-section is shown in FIG. 3A, is seen from one side in the layering direction (Z direction).

Furthermore, in FIG. 3A, a broken dotted line 402 is a line indicating the shape of the shaped object 50 indicated by the shaped object data. The shape of the shaped object 50 indicated by the shaped object data is, for example, the shape of the shaped object 50 represented with a resolution higher than the resolution of shaping. More specifically, the broken dotted line 402 can be considered as a line, and the like indicated with a resolution higher than the resolution of shaping for a curved surface, an inclined surface, and the like in the shape indicated by the shaped object data. Furthermore, in FIG. 3A, only one part is shown for the cross-section of the shaped object 50. Moreover, in FIG. 3A, an object interior is the interior of the shaped object 50. In FIGS. 3A and 3B, the ejecting position 302 is the ejecting position of ejecting one of the inks at the time of shaping the shaped object 50. In this case, the ejecting position can be considered as, for example, a design ejecting position set according to the resolution of shaping.

When carrying out shaping using the shaping device 12 (see FIG. 1), the shape of the shaped object 50 is represented within a range representable with the resolution of shaping set in advance. Thus, a curved surface portion and an inclined portion in the surface of the shaped object 50 are formed to a close shape in a range representable with the ejecting positions 302 lined at an interval corresponding to the resolution of shaping. In this case, the inclined portion is, for example, a portion inclined with respect to the main scanning direction, the sub-scanning direction, or the layering direction.

In this case, the shape of the surface of the shaped object 50 to be actually shaped is a shape in which the shape indicated with the broken dotted line 402 is approximated according to the resolution of shaping, as shown in FIG. 3A. As a result, a step (step of a voxel unit) of a height corresponding to the resolution of shaping is formed on the surface of the shaped object 50. When such step is formed, the steps are continued at the surface of the shaped object 50 thus forming a stripe-like pattern (layering stripe). Furthermore, a step worth a plurality of (e.g., two) voxels shown as a step overlapping portion 304 in FIG. 3A is sometimes formed at some positions depending on the shape of the shaped object 50. The step overlapping portion 304 is, for example, a portion where a position within a plane (within XY plane) orthogonal to the layering direction is the same as an adjacent slice data in the layering direction of the contour of the slice data. Furthermore, the step overlapping portion 304 can be considered as, for example, a step and the like of when an outer edge portion of the layer of ink is overlapped at the same position (same position within the plane orthogonal to the layering direction). Moreover, the step overlapping portion 304 can be considered as, for example, a step and the like having a height of integral multiples of a normal height. In this case, the layering stripe corresponding to the step overlapping portion 304 is assumed to particularly stand out.

Furthermore, in FIG. 3B, a broken line 404 indicates a position of a stripe (stripe having a height worth a plurality of steps) formed by connecting the step overlapping portion 304. A broken line 406 indicates a position of a stripe (stripe having a height worth one step) corresponding to a step other than the step overlapping portion 304. The step other than the step overlapping portion 304 is, for example, the step worth a height of one voxel. In this case, the stripe at the position of the broken line 404 formed by the step overlapping portion 304 is strongly visualized as a step configuring the stripe is large compared to the stripe having the height worth one step at the position of the broken line 406. As a result, the influence on a quality of shaping becomes particularly large. Such influence of stripe is not limited occurring in the direction shown in FIGS. 3A and 3B, and may also occur in other directions. More specifically, such problem of stripes occurs in any direction of the main scanning direction, the sub-scanning direction, and the layering direction. Thus, it is desired to appropriately prevent the layering stripes from standing out to enhance the quality of shaping. In the present example, on the other hand, the change of contour is carried out at the time of generating the slice data, as described above. Such change is carried out so that the layering stripe does not stand out by applying fluctuation to the shaped object 50, as will be described below.

Figure 4A:
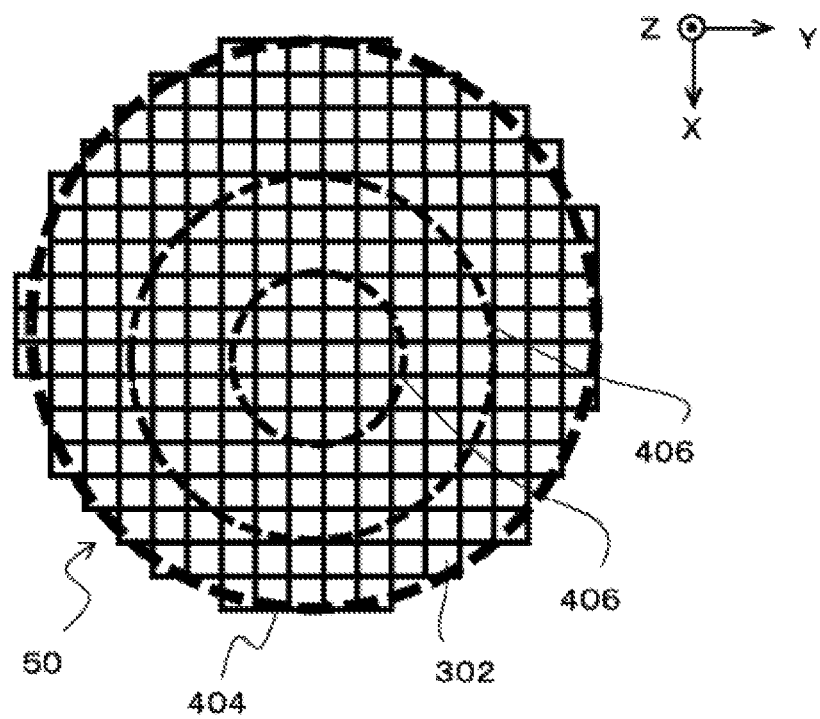
FIGS. 4A to 4B are views describing a change of contour of the slice data in further detail.
Figure 4B:
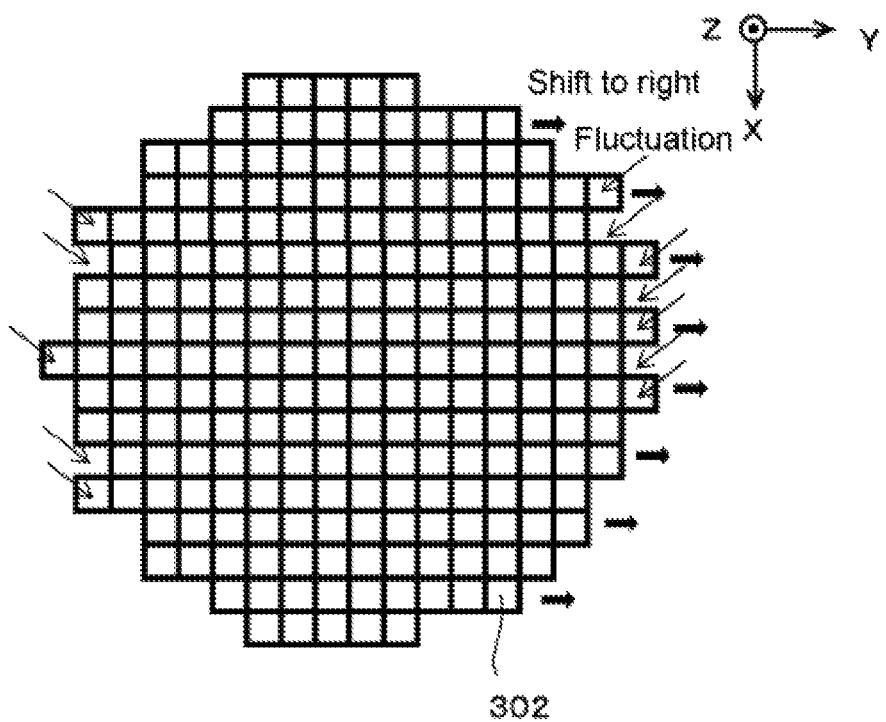

FIGS. 4A to 4B are views describing the change of contour of the slice data in further detail. FIG. 4A is a view describing the outer appearance of the shaped object 50 when the change of contour is not carried out with respect to the slice data, and illustrates anew the content same as FIG. 3B for the sake of convenience of explanation. FIG. 4B is a view showing one example of the change of contour carried out with respect to the slice data, and shows one example of the ejecting position 302 specified by one piece of slice data.

As described above, in the present example, the fluctuation is applied to the shaped object 50 to soften the stripe pattern by changing the contour of the slice data. In this case, soften the stripe pattern means, for example, making the stripe pattern to less stand out visually. More specifically, in the case shown in FIG. 4B, a process of shifting one part of the ejecting positions 302 configuring the contour of the slice data toward the right side in the figure, as shown in the figure with an arrow parallel to the main scanning direction (Y direction) is carried out. Furthermore, in this case, when an arrangement of the plurality of ejecting positions 302 lined in a constant direction is defined as a line, the plurality of lines lined in the sub-scanning direction (X direction) are alternately shifted toward the right side by one voxel position. Thus, the position in the main scanning direction of the ejecting position is shifted by the number of voxels set in advance.

In this case, an irregular fluctuation, as shown with an arrow in a diagonal direction in the figure, can be applied to the contour of the slice data. In this case, applying the fluctuation to the contour of the slice data means, for example, changing the contour of the slice data so that the fluctuation is applied to the shaped object shaped using the slice data. Furthermore, in this case, for example, the step formed in correspondence with the contour portion of the slice data in the layer of ink formed at the time of shaping the shaped object 50 can be appropriately prevented from connecting, and the like over a long distance along a constant line or a curved line. Furthermore, for example, a continuity of the contour of the layer of ink thus can be reduced and a visibility of the stripes can be lowered. According to such configuration, for example, the layering stripes thus can be appropriately prevented from standing out.

In this case, the contour is less likely to overlap at the same position (same position in the XY plane) in the continuing plurality of layers of ink by applying the fluctuation to the contour. Furthermore, for example, a range to become the step overlapping portion 304 (see FIG. 3) can be further reduced. Thus, according to such configuration, a range in which the height worth the plurality of layers of ink is formed can be reduced than when the fluctuation is not applied. Moreover, for example, the layering stripe can be more appropriately prevented from standing out.

In the shaping device 12 (see FIG. 1), for example, consideration is made to carry out the shaping in a multipass method. Carrying out the shaping in the multipass method means, for example, causing the inkjet head to carry out a plurality of main scanning operations to the same position in the operation of forming the layer of ink corresponding to one piece of slice data. In this case, the operation described using FIG. 4B can be considered as, for example, an operation of shifting the ejecting position by a predetermined amount for every pass when carrying out the shaping in the multipass method. Shifting the ejecting position by a predetermined amount means, for example, shifting the ejecting position in the main scanning direction by a predetermined number of voxels (n voxels; n is an integer greater than or equal to one) set in advance. According to such configuration, for example, the fluctuation can be appropriately applied to the contour of the slice data. Thus, the layering stripe can be suppressed from standing out.

Furthermore, as described above, in the present example, the intermediate data generated based on the shaped object data is generated, and furthermore, the slice data is generated based on the intermediate data. Moreover, data specifying the ejecting position in the same format as the slice data is used for the intermediate data. Thus, the intermediate data can also be considered as, for example, data specifying the ejecting position of before the shift, and the like. Furthermore, the slice data generated based on the intermediate data can be considered as data in which the ejecting position specified in the intermediate data is shifted, and the like. Moreover, in this case, the slice data can be considered as, for example, data in which the ejecting position of a line (e.g., line corresponding to odd numbered pass) formed with some main scanning operations is shifted by n voxels in the main scanning direction, and the like, as shown in the figure, for example, compared to the intermediate data of before the shift. The operation of shifting the ejecting position in this manner can also be considered as, for example, an operation of changing the slice data so that the ejecting position in some main scanning operations shifts in the main scanning direction, and the like. More specifically, in this case, in the process of changing the contour of the slice data, for example, consideration is made to generate the slice data so that the position in the main scanning direction is shifted compared to the ejecting position specified in the intermediate data for the ejecting position to where the ink is ejected in some main scanning operations of the plurality of main scanning operations. According to such configuration, for example, the change of contour of the slice data can be appropriately carried out. Furthermore, the ejecting position to where the ink is actually ejected is shifted by carrying out the ejection of the ink based on such slice data, and hence the layering stripe is less likely to stand out.

Furthermore, in FIG. 4B, the manner of applying fluctuation to the contour is illustrated for a case of shifting the position in the main scanning direction. When considered in a more generalized manner, however, a method of applying fluctuation is not limited to the main scanning direction, and the sub-scanning direction and the layering direction can also be considered. When configured in such manner as well, for example, the fluctuation can be appropriately applied to the outer edge portion of the layer of ink. Furthermore, the direction of applying fluctuation may not be only one direction (e.g., main scanning direction), and the fluctuation may be applied in a plurality of directions. Moreover, with respect to the fluctuation, consideration can be made that when fluctuation is applied in one direction, fluctuation also occurs in the two other directions.

More specifically, with respect to the manner of applying fluctuation, when shifting an ejecting position in the sub-scanning direction and applying fluctuation, for example, consideration is made to shift the ejecting position specified in the slice data by n voxels for every m voxels (m is an integer greater than or equal to one) in the main scanning direction compared to the ejecting position specified in the intermediate data. When shifting the ejecting position within the plane (XY plane) orthogonal to the layering direction, the manner of changing the contour of the slice data can be considered as, for example, a method of shifting some voxel positions configuring the outer edge portion of the slice data in the main scanning direction or the sub-scanning direction, and the like. Furthermore, in this case, for example, consideration is made to select the voxel position to shift the position for every predetermined number of voxel positions along the outer edge (outer periphery) of the slice data. Furthermore, in this case, consideration is made to have the shift amount of the voxel position to for example, one to two voxel positions (e.g., by one voxel position). Moreover, in this case, in the process of generating the slice data, for example, the change of contour of the slice data is carried out on at least some slice data so that some ejecting positions configuring the contour are shifted in at least one of either the main scanning direction or the sub-scanning direction compared to the slice data in which the contour is the same as the corresponding intermediate data. Furthermore, in this case, for example, consideration is made to carry out the change of contour of the slice data, and the like so that fluctuation is increased compared to when using the slice data in which the contour is the same as the intermediate data. According to such configuration, for example, the contour of at least some slice data can be appropriately differed from the contour of the corresponding intermediate data. Furthermore, the fluctuation can be applied to the contour of the slice data to blur the contour. Moreover, for example, the layering stripe can be appropriately prevented from standing out by applying fluctuation.

Furthermore, in this case, the contour of the slice data is preferably changed so that a range in which the outer edge portion of the layer of ink is overlapped at the same position such as the step overlapping portion 304 (see FIG. 3) described above reduces. In this case, the range in which the outer edge portion of the layer of ink is overlapped at the same position can be considered as, for example, a portion the outer edge portions of the plurality of layers of ink continuously overlapped in the layering direction overlap at the same position. Furthermore, more specifically, for example, consideration is made to carry out the change of contour of the slice data, and the like so that step overlapping portion 304 is reduced compared to when the slice data in which the contour is the same as the intermediate data is used. According to such configuration, for example, the layering stripes can be more appropriately prevented from standing out.

As described above, the application of fluctuation may be carried out by shifting the ejecting position in the layering direction. In this case, for example, consideration is made to divide one piece of intermediate data corresponding to one layer of ink by, for example, N (N is an integer greater than or equal to two) with a grid shaped mask, and reconfigure the divided data to generate the slice data. More specifically, in this case, for example, consideration is made to generate the slice data of the Nth layer by combining (1/N) divided data of N-kth layer (k is an integer greater than or equal to one and smaller than N) to (1/N) divided data of Nth layer in the divided data in which the intermediate data is divided.

Furthermore, in the description made above, the application of fluctuation to the shaped object 50 is mainly described for a case of applying fluctuation by changing the slice data. However, consideration is also made to carry out the application of fluctuation to the shaped object 50 by, for example, changing the operation of the shaping device 12 (see FIG. 1). In this case, consideration is made to use the data described as the intermediate data above as is for the slice data, and shift the ejecting position by the setting of the operation of the shaping device 12, and the like. More specifically, in this case, consideration is made to shift the ejecting position in some main scanning operations (e.g., main scanning operation of ejecting ink to a position of a line corresponding to an odd numbered pass) by n voxels in the main scanning direction with respect to the slice data same as the intermediate data described above. Even when configured in such manner, for example, the fluctuation can be appropriately applied with respect to the shaped object 50 actually formed according to the slice data. Thus, for example, the layering stripe can be appropriately prevented from standing out.

Furthermore, more specifically, in this case, for example, consideration is made to differ a reference position of some main scanning operations from the other main scanning operations for a reference position to become a reference of the ejecting position of ejecting ink in the main scanning operation. In this case, the reference position is, for example, the reference position in the main scanning direction. Furthermore, differing the reference position of the main scanning operation means, for example, differing a landing position of the ink in some main scanning operations from a landing position of the ink in the other main scanning operations for the ejecting position where the position in the main scanning direction is the same in the slice data. In this case, the landing position of the ink in the main scanning operation is, for example, a design landing position in the main scanning direction. Furthermore, in this case, for example, consideration is made to set the reference position set with respect to some main scanning operations of the plurality of main scanning operations so that the position in the main scanning direction is shifted by a preset number of voxels (e.g., n voxels) with respect to the reference position set with respect to the other main scanning operations. According to such configuration, for example, the fluctuation can be appropriately applied to the outer surface shape of the shaped object.

In this case, the process of converting the intermediate data to the slice data, and the like does not need to be carried out, and thus whether or not to apply fluctuation can, for example, be determined after generating the slice data. Thus, in this case, the shaping device 12 may accept the selection (selection of operation mode, etc.) on whether or not to apply the fluctuation from a user, and apply the fluctuation only when instructed by the user. According to such configuration, for example, the shaped object of a desired quality can be more appropriately shaped by applying the fluctuation only when necessary.

The operation of generating the slice data based on the intermediate data will now be described in further detail. As also described above, consideration is made to apply a predetermined mask for data conversion to the intermediate data at the time of generating the slice data. FIGS. 5 and 6 are views describing one example of the operation of changing the contour of the slice data by applying the mask.

Figure 5A:
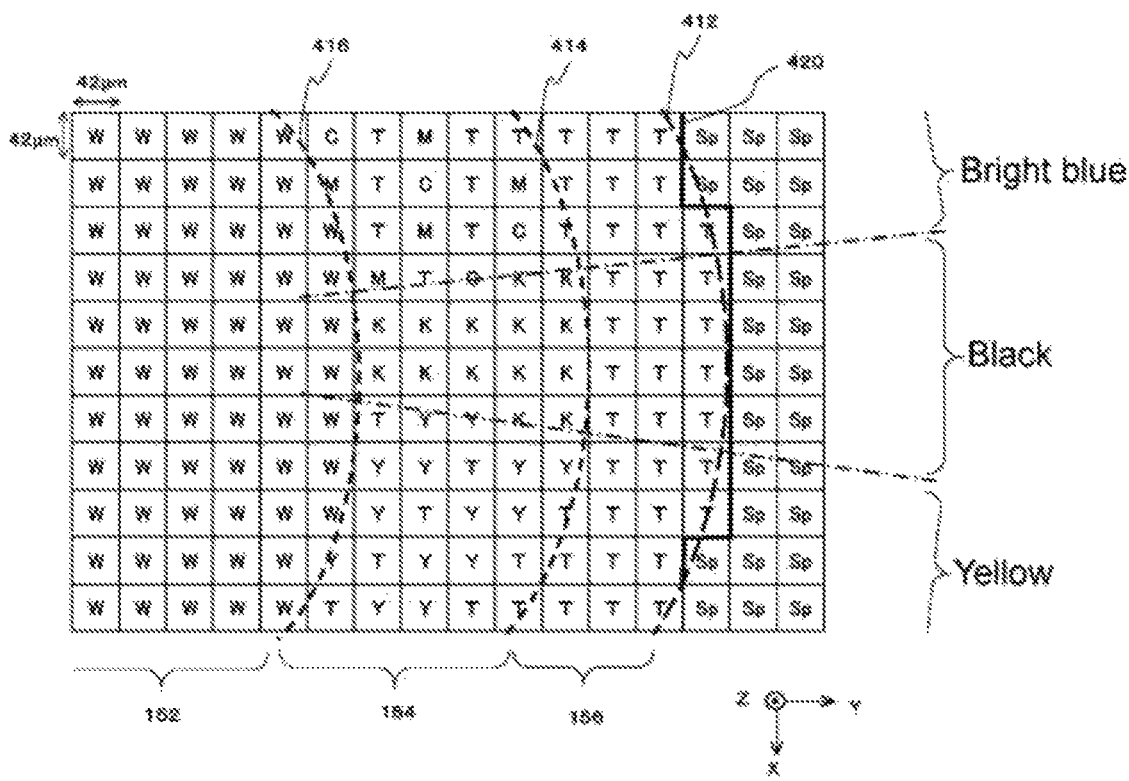
FIGS. 5A to 5B are views describing one example of an operation of changing the contour of the slice data by applying a mask.

FIG. 5A is a view (voxel arrangement diagram) showing one example of a configuration of the intermediate data. As also described above, in the present example, data specifying the ejecting position in the same format as the slice data is used for the intermediate data. In this case, the intermediate data becomes data indicating the cross-section of each region (interior region 152, coloring region 154, and protective region 156) and the support layer 52 configuring the shaped object 50, as shown in the figure. In this case, indicating the cross-section of each region, and the like means, for example, specifying the ejecting position of the ink used to form the region. Furthermore, specifying the ejecting position of the ink means, for example, corresponding the voxel position included in the cross-section and the color of ink. Moreover, in the figure, the character of each voxel position indicates the type of ink (type of voxel) ejected to the relevant voxel position. More specifically, W indicates the ejecting position of the white ink. T indicates the ejecting position of the clear ink. Y, M, C, and K indicate the ejecting position of the ink (color ink) of each color of the process colors. Furthermore, Sp indicates the ejecting position of the ink (support ink) used as the support material. Moreover, in FIG. 5A, the voxel arrangement diagram is shown for a case of coloring the coloring region 154 to light blue (bright blue), black, and yellow.

Furthermore, in FIG. 5A, an example of when the resolution of shaping in the main scanning direction and the sub-scanning direction is 600 dpi is illustrated. In this case, the size of one voxel is 42 square as schematically shown in the figure. Furthermore, in this case, a dot of the ink actually formed at the time of shaping may not necessarily be the same as the theoretical shape of the voxel. More specifically, in the present example, for example, consideration is made to form a dot of an ink that spreads to a circular shape having a diameter of about 100 μm.

Furthermore, in FIG. 5A, a broken line 412, a broken line 414, and a broken line 416 are lines indicating a boundary of each region of when the shape of the shaped object 50 is indicated with a resolution higher than the resolution of shaping. In this case, indicating the shape of the shaped object 50 with the resolution higher than the resolution of shaping means, for example, indicating the shape of the shaped object 50 in a state before carrying out a conversion of resolution corresponding to the resolution of shaping at the time of generating the intermediate data, and the like. Furthermore, an outer shape line 420 is a line indicating the shape of the outer surface of the shaped object 50 with the resolution of shaping, and shows a contour (outer shape line of one layer) configuring the outermost periphery of the cross-section of the shaped object 50 along the boundary of the voxel, as shown in the figure. The outer shape line 420 can also be considered as, for example, a line representing the broken line 412 with the resolution of shaping, and the like.

Moreover, in this case, the outer shape line 420 includes a linear long portion, as shown in the figure. Thus, when the shaping that uses the slice data in which the contour is the same as the intermediate data is carried out, a long step continuously connected in one direction is formed at an end of the layer of ink. As a result, the layering stripe may easily stand out. In the present example, on the other hand, the slice data having a different contour from the intermediate data is generated for example, by applying a predetermined mask on the intermediate data, and the shaping of the shaped object 50 is carried out, as described above.

Figure 5B:
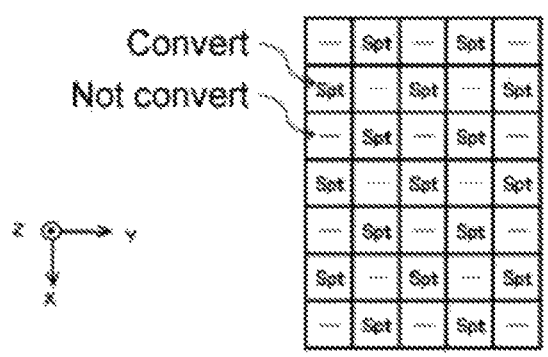

FIG. 5B shows one example of a mask to be applied to the intermediate data. The mask is a mask that changes the specification of the ejecting position so as to eject the support material in place of the ink to some ejecting positions. More specifically, in the figure, a symbol Spt is a symbol that indicates replacing the clear ink (T ink) with the ink (Sp ink) to use as the support material. Furthermore, a symbol—is a symbol that indicates not to carry out such replacement. In this case, the mask can be considered as a mask for converting the voxel (T voxel) of the T ink to the voxel (Sp voxel) of the Sp ink, and the like.

Figure 6A:
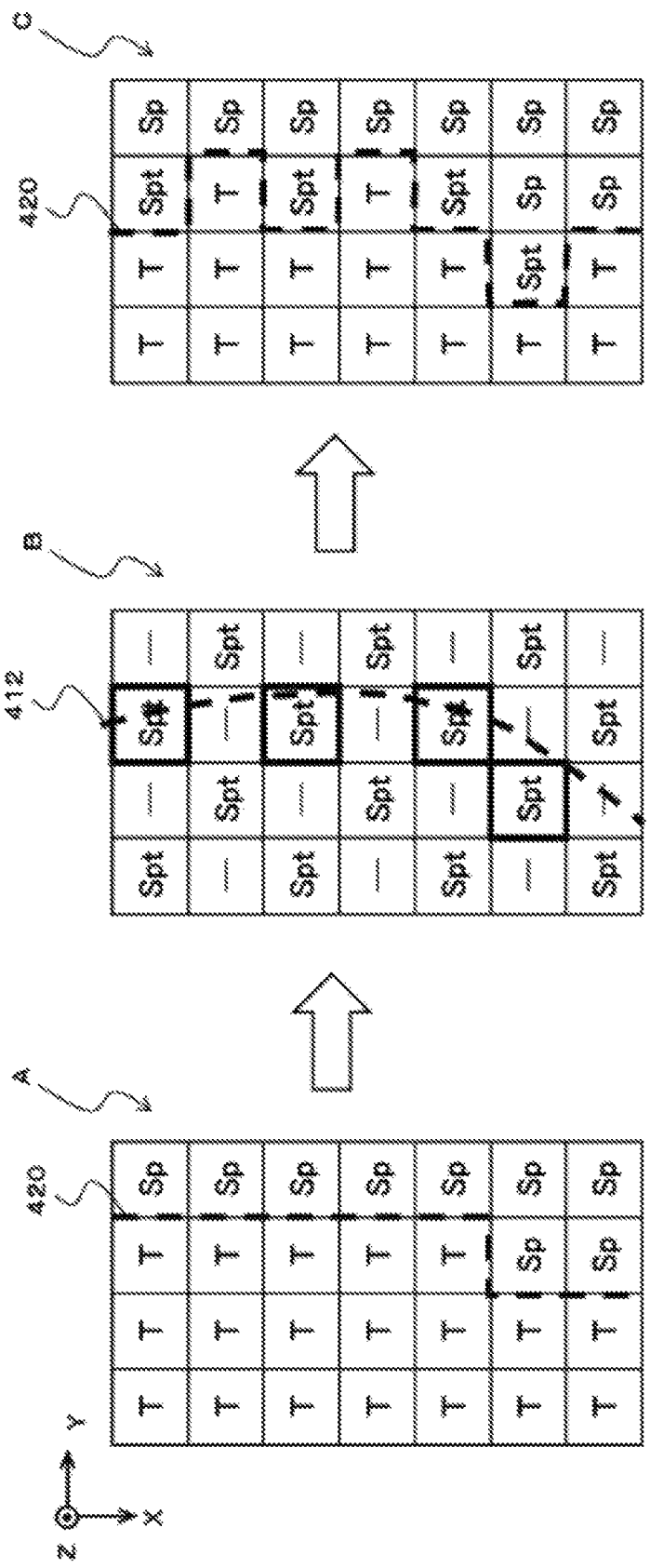
FIGS. 6A to 6B are views describing one example of the operation of changing the contour of the slice data by applying the mask.

FIG. 6A is a view describing the operation of applying the mask in further detail. In FIG. 6A, a view shown with an arrow denoted with a reference symbol A is a view showing a state before the application of the mask, and shows one part of the intermediate data shown in FIG. 5A in an extracted manner. In this case, the outer shape line 420 includes a linear long portion, as shown in the figure. As a result, the layering stripe may easily stand out.

Furthermore, a view shown with an arrow denoted with a reference symbol B is a view showing an ejecting position replaced by the application of the mask. More specifically, in the present example, the mask is applied only with respect to the ejecting position lined at an outermost periphery of the shaped object 50 when using the mask shown in FIG. 5B. Furthermore, in this case, for example, consideration is made to select only the ejecting position at the voxel position intersecting the line of the outer shape indicated with the broken line 412 in FIGS. 5A and 6A, and apply the mask. In this case, for example, the specification of the ink to be ejected is converted from the clear ink (T ink) to the support material (Sp ink) at four ejecting positions indicated with a thick line in the figure.

Furthermore, a view shown with an arrow denoted with a reference symbol C shows a configuration (configuration after mask process) of the slice data generated by applying the mask to the intermediate data. In this case, as the ink to eject to the four ejecting positions is converted to the support material, the outer shape line 420 after the process has a fewer portion connected long to a linear shape compared to before the process. In this case, the outer shape line 420 before the process is a line indicating the shape of the outer surface of the shaped object 50 with the resolution of shaping in the intermediate data. Furthermore, the outer shape line 420 after the process is a line indicating the shape of the outer surface of the shaped object 50 with the resolution of shaping in the slice data.

Figure 6B:
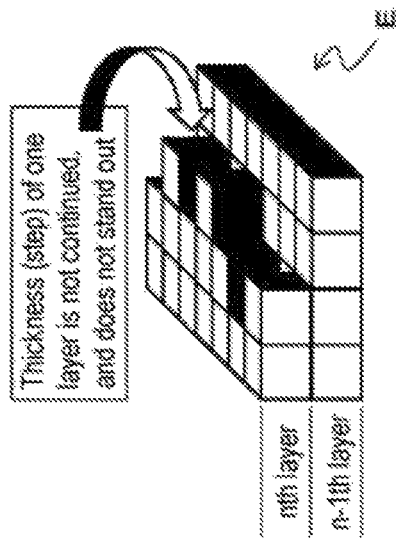
Figure 6B:
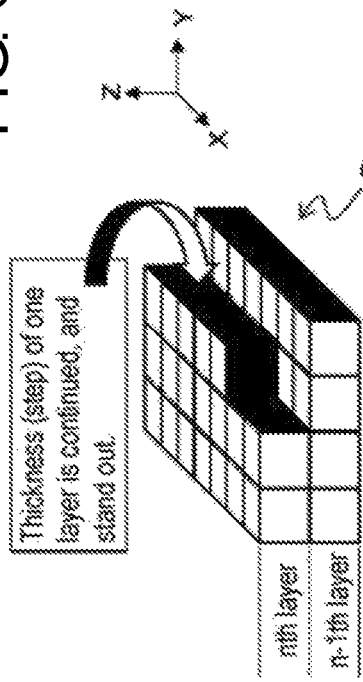

FIG. 6B is a view describing the effect of applying the mask in further detail, and schematically shows a state in which two continuing layers of ink, n−1 th layer and nth layer, are overlapped. Furthermore, in FIG. 6B, a view shown with an arrow denoted with a reference symbol D shows a result of carrying out shaping without carrying out the application of the mask. Moreover, this figure can be considered as, for example, an example of the shaping result of when the slice data in which the contour is the same as the intermediate data is used. In this case, as apparent from the figure, the step having the thickness (height) of one layer of ink is continuously connected to a long linear shape. As a result, the layering stripe may easily stand out.

A view shown with an arrow denoted with a reference symbol E, on the other hand, indicates the result of carrying out shaping using the slice data generated by carrying out the application of the mask. In this case, as apparent from the figure, a state in which the step having the thickness (height) of one layer of ink is not continuously connected to a long linear shape is obtained. As a result, the layering stripe is less likely to stand out. According to such configuration, for example, the layering stripes thus can be appropriately prevented from standing out.

A mask having a pattern different from the pattern described above may be used for the mask. More specifically, the mask described above is a so-called checkered mask in one voxel unit. However, when using the checkered mask, the period of the pattern is not limited to one voxel unit. In this case, for example, consideration is made to use a checkered mask of two voxel units, 2×2 voxel units, in which two voxels units are in the main scanning direction and the sub-scanning direction, and the like. The pattern of the mask is not limited to the checkered mask, and for example, a mask of other periodic patterns may be used. In this case, the periodic pattern is preferably used with respect to the main scanning direction and the sub-scanning direction. Furthermore, a mask of a non-periodic pattern may be used for the mask.

Next, other application examples will be described for the feature of applying fluctuation to the shaped object 50. In the description made above, the feature of applying fluctuation to the shaped object 50 has been mainly described for a case of applying fluctuation for the purpose of suppressing the layering stripe from standing out. However, consideration is made to carry out the application of fluctuation for, for example, a purpose other than the purpose of suppressing the layering stripe from standing out. In this case, for example, consideration is made to have a texture of the surface of the shaped object to a matte tone by changing the contour of the slice data, and the like. Furthermore, more specifically, in this case, for example, the contour of the slice data of at least one part is differed from the corresponding intermediate data so that at least one part of the surface of the shaped object has a matte tone in the data converting process. According to such configuration, for example, the shaped object 50 having a surface of a matte tone can be appropriately manufactured, as necessary.

Figure 7A:
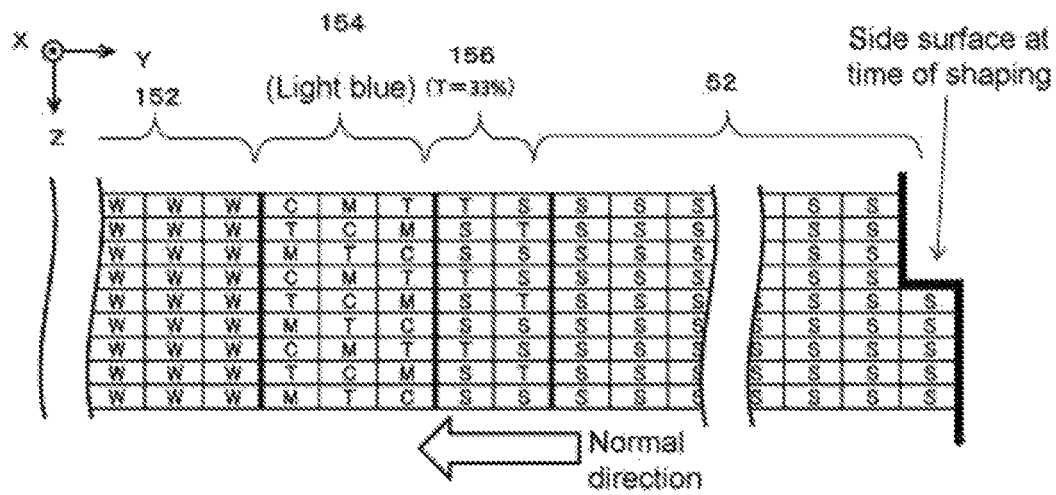
FIGS. 7A to 7C are views describing the operation of shaping the shaped object 50 in which the surface has a matte tone in further detail.
Figure 7B:
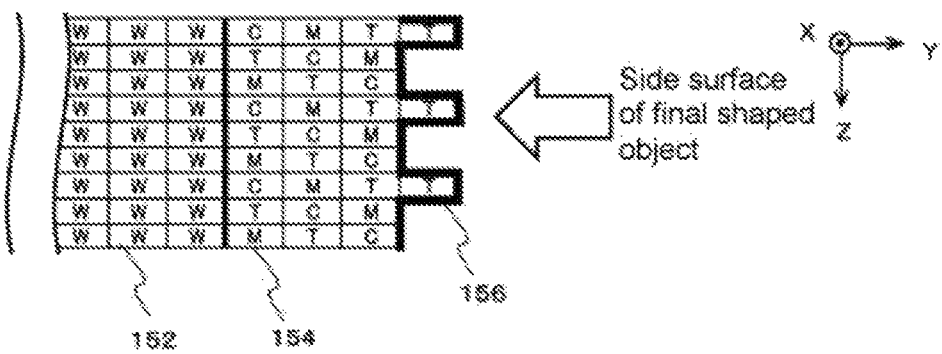
Figure 7C:
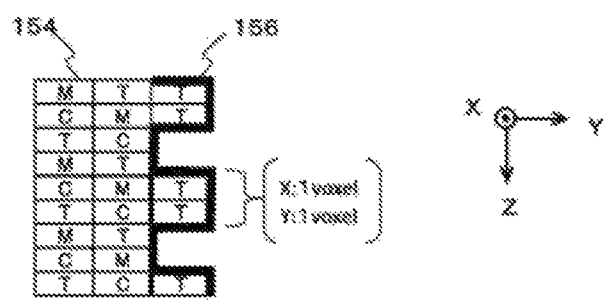

FIGS. 7A to 7C are views describing the operation of shaping the shaped object 50 in which the surface has a matte tone in further detail. Other than the points described below, in FIGS. 7A to 7C, a configuration denoted with the same reference numerals as FIGS. 1 to 6 may have a feature same as or similar to the configuration in FIGS. 1 to 6.

FIG. 7A is a view schematically showing a voxel configuring one part of the shaped object 50. When shaping the shaped object 50 in which the surface has a matte tone as well, the slice data is generated same as or similar to the case described above, and the shaping of the shaped object 50 is carried out in the shaping device 12. Furthermore, in this case, the protective region 156 formed on the outermost surface of the shaped object 50 is formed to a matte tone by changing the contour of the slice data. More specifically, in this case, for example, a dot of a clear ink is disposed at a discrete voxel position in the voxel unit (droplet unit) at the outermost layer of the shaped object 50 to form the protective region 156 of a matte tone by changing the specification of the ejecting position by application of the mask. The dot of the ink (support ink) to become the support material is disposed between the dots of the clear ink (portion where the dot of the clear ink is not disposed) configuring the protective region 156. According to such configuration, for example, the surface of the shaped object 50 can be formed to a matte tone by removing the support layer 52 after the shaping is completed. Furthermore, in this case, consideration is made to correspond each voxel position configuring each region and the support layer 52 of the shaped object 50 with, for example, the ink of each color as shown in FIG. 7A.

The configuration shown in FIG. 7A is one example of a configuration of a voxel at the time point of before removing the support layer 52. Furthermore, in FIG. 7A, a configuration of the voxel of when coloring the coloring region 154 to a light blue color is shown. In this case, at the time point of before removing the support layer 52, a portion to become the protective region 156 is configured by the voxel (T) corresponding to the dot formed with the clear ink and the voxel (S) corresponding to the dot formed with the support ink. Furthermore, in the case shown in the figure, the protective region 156 is formed so that an area occupancy of the clear ink at this portion becomes 33%. In this case, when referring to the area occupancy of the clear ink becoming 33%, for example, this means that, with respect to the voxels configuring the portion corresponding to the protective region 156, one voxel per three voxels is the voxel corresponding to the clear ink, as shown in the figure. Furthermore, in this case, the voxel corresponding to the support ink is eliminated by removing the support layer 52, and the protective region 156 of irregular form in voxel unit is formed on the surface of the shaped object 50.

FIG. 7B shows one example of a state after the support layer 52 is removed from the state shown in FIG. 7A (state of final shaped object in which shaping is completed). When the support layer 52 is removed from the state shown in FIG. 7A, only the voxel making contact with the coloring region 154 is remained without being removed of the voxels of the clear ink configuring the portion corresponding to the protective region 156 in FIG. 7A, and the voxel not making contact with the coloring region 154 is removed with the support layer 52. Thus, the state after the removal of the support layer 52 is a state in which a portion of convex shape formed with the clear ink is discretely formed at the portion making contact with the coloring region 154, as shown in FIG. 7B. In this case, the surface of the shaped object 50 after the shaping is completed has a matte tone that diffusely reflects the light. More specifically, in the case shown in the figure, the portion of convex shape in voxel unit is formed with the clear ink in 33% of the surface of the coloring region 154. According to such configuration, for example, a region of matte tone is formed at a desired position in the surface of the shaped object 50, and a way the surface of the shaped object 50 is seen can be appropriately adjusted. Thus, for example, the unintended difference can be appropriately prevented from occurring in a glossiness by an angle of the outer peripheral surface of the shaped object 50, and the like.

A thickness of the protective region 156 formed on the outermost surface of the shaped object 50 is preferably, for example, about 100 to 200 µm. According to such configuration, for example, the surface of the shaped object 50 can be appropriately formed to a matte tone. Furthermore, in the shaped object 50, the relation with the number of voxels lined in a normal direction orthogonal to the surface of the shaped object 50 is also important in the thickness of each region. For example, the protective region 156 is preferably formed so that the number of voxels lined in the normal direction and an in-plane direction orthogonal to the normal direction is about one to two as roughness stands out if the shape of irregularities is large. More specifically, in this case, the number of voxels configuring one protrusion is preferably one (1×1×1 voxel) or about two (1×1×2 voxels) to eight (2×2×2 voxels) with the number of voxels lined in each direction of X, Y, Z about one to two. Furthermore, in FIGS. 7A, 7B and the like, the configuration of the voxel is shown in a simplified manner for a case in which the group of voxels of a surface continuing in the XY direction foul's one layer (one layer) in the shaped object 50. With respect to the dimension of each voxel, when a dimension in the in-plane direction is greater at a ratio of (e.g., Z:Y) a dimension in the layering direction (Z direction) and the dimension in the in-plane direction (e.g., Y direction), a region corresponding to the data (slice data) indicating the shape and color of one cross-section in the shaped object 50 may be formed by a plurality of layers.

With respect to the operation of shaping the shaped object 50 in which the surface has a matte tone, the operation described above can be considered as, for example, an operation of forming the dot of the ink for matte processing with respect to at least one part of the outermost surface of the shaped object 50 when shaping the shaped object 50 through the layered shaping method. More specifically, in the operation described above, the protective region 156 having a matte tone is formed with a constant thickness with respect to the normal direction of the outer surface of the shaped object 50 using the clear ink for the ink for matte processing. In this case, the protective region 156 can be considered as a region formed to a matte tone with the clear ink on the surface of the shaped object 50, and the like. In this case, whether or not to carry out the process of forming the protective region 156 of matte tone (propriety of matte processing) is preferably selectable (settable) by the user. In this case, for example, consideration is made to accept instruction by an operation of the user on the control PC 14 (see FIG. 1). Furthermore, in this case, the area occupancy of the ink for matte processing in the region to be formed to a matte tone is more preferably settable by the user. The area occupancy of the ink for matte processing in the region to be formed to a matte tone is, for example, the area of the portion formed to a convex shape occupies in the range where the protective region 156 is formed to a matte tone on the surface of the shaped object 50. Furthermore, the area of the portion formed to a convex shape is, for example, the design area occupied by the voxel configuring the portion of convex shape.

Next, a variant of the operation of shaping the shaped object 50 in which the surface has a matte tone will be described. FIG. 7C is a view describing a variant of a manner of forming a protective region 156 in a matte tone. In the description made above, an example of when forming one protrusion with one voxel has been mainly described for the portion (protrusion) of convex shape in the protective region 156 having a matte tone. However, in a further variant of the configuration of the shaped object 50, one protrusion may be formed with a plurality of voxels.

More specifically, when the shape of each voxel is a shape of large aspect ratio, a difference forms in the shape of the protrusion by an angle of the plane in the surface of the shaped object 50, and consequently, a difference also forms in a state of the matte tone. Thus, the number of voxels configuring one protrusion and the arrangement of the voxels are considered to be determined according to the aspect ratio of the voxel. For example, when the aspect ratio of the in-plane direction (X direction and Y direction) orthogonal to the layering direction and the layering direction (Z direction) is 2:1 (two times) in one voxel, consideration is made to form one protrusion in the protective region 156 of matte tone with two voxels (1×1×2 voxels), and line the two voxels in the layering direction, as shown in FIG. 7C. When configured in such manner, a width in the layering direction of one protrusion becomes twice the one voxel, and thus the shape of each protrusion can be made closer to a cube. Thus, for example, the difference can be appropriately prevented from forming in the state of the matte tone by the angle of the plane in the surface of the shaped object 50. Furthermore, in the case shown in FIG. 7C, the area occupancy of the clear ink in the protective region 156 is 50%.

Figure 8A:
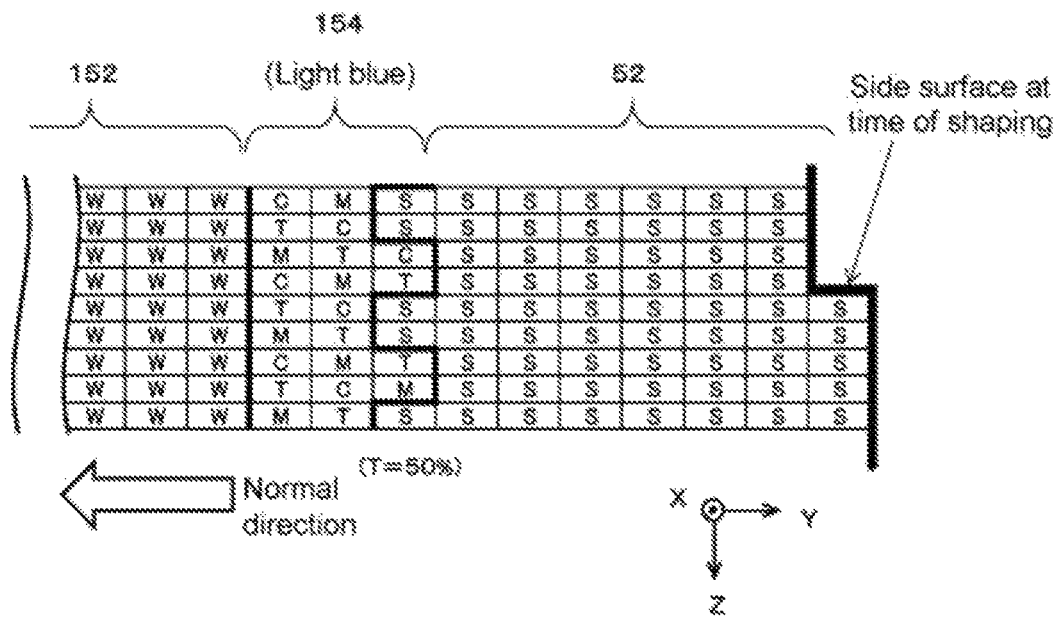
FIGS. 8A to 8B are views describing a further variant of the operation of shaping the shaped object 50 in which the surface has a matte tone.
Figure 8B:
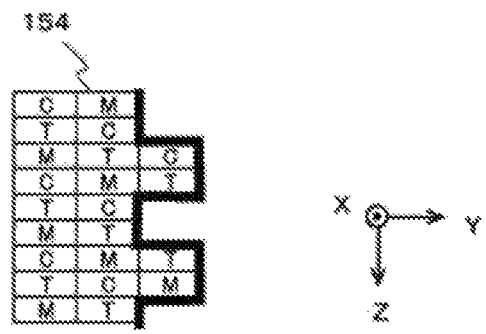

In the description made above, an example of when forming the region to be formed to a matte tone with the clear ink on the outer side of the coloring region 154 has been mainly described. However, in a further variant of the configuration of the shaped object 50, for example, consideration is made to also use one part of the coloring region 154 as a region of matte tone. FIGS. 8A to 8B are views describing a further variant of the operation of shaping the shaped object 50 in which the surface has a matte tone. FIG. 8A is a view schematically showing a voxel configuring one part of the shaped object 50 in the present variant, and shows one example of a state before removing the support layer 52 at the time of shaping the shaped object 50. FIG. 8B shows one example of a state in the vicinity of a coloring region 154 after the support layer 52 is removed. Other than the points described below, in FIGS. 8A to 8B, a configuration denoted with the same reference numerals as FIGS. 1 to 7 may have a feature same as or similar to the configuration in FIGS. 1 to 7.

As described above, in a further variant of the configuration of the shaped object 50, for example, consideration is made to also use one part of the coloring region 154 as the region of matte tone. More specifically, consideration is made to shape the shaped object 50 so that the coloring region 154 is exposed at the outermost surface of the shaped object 50, and the like depending on the quality demanded on the shaped object 50, and the like. In such a case, instead of separately forming the protective region 156 of matte tone on the outer side of the coloring region 154, consideration is made to have one part of the coloring region 154 also function as the region of matte tone by forming the portion on the outermost side in the coloring region 154 to an irregular form. In this case, one part of an outermost periphery in the coloring region 154 becomes the region of matte tone, as shown in FIGS. 8A to 8B. Furthermore, such configuration can be considered as, for example, a configuration in which at least one part of the portion exposed at the surface of the shaped object 50 in the coloring region 154 is formed to a matte tone, and the like.

In this case, in the process of generating the slice data from the intermediate data, for example, the replacement of the ejecting position is carried out so that the support material is ejected to some voxel positions on the outermost surface of the coloring region 154 by applying the mask of the predetermined pattern. According to such configuration, for example, the surface of the shaped object 50 can be formed to the state of matte tone that diffusely reflects the light not by the method of increasing the voxel on the outer side of the coloring region 154 but by decimating the voxel of the coloring region 154. More specifically, in this case, the outermost surface of the coloring region 154 is, for example, in a state some voxels are replaced with the voxels of the support ink, as shown in FIG. 8A. In this case, when the support layer 52 is removed after the shaping of the shaped object 50 is completed, irregularities are formed on the surface of the shaped object 50, as shown, for example, in FIG. 8B. Thus, in the present variant as well, for example, the surface of the shaped object 50 can be appropriately formed to a matte tone.

When forming one part of the coloring region 154 to a matte tone as in the present variant, one part of the voxels of the ink (color ink) for coloring configuring the coloring region 154 disappears. However, the substantive resolution in the color tone and the way the color is seen in the final shaped object 50 is determined by the influence of a great number of voxels. Thus, even if the region of matte tone is formed as in the present variant, the influence on the image quality, and the like of the surface of the shaped object 50 can be usually ignored. Furthermore, in this case, the influence of forming the region of matte tone can be further reduced by increasing the number of voxels to be lined in the normal direction in the coloring region 154 as necessary to a sufficiently large number. Furthermore, in a further variant of the shaped object 50, consideration is also made to form the region of matte tone through methods other than the above. More specifically, for example, when not coloring the surface and forming at least one part of the surface of the shaped object 50 with white ink, consideration is also made to use white ink for the ink for matte processing, and the like.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A manufacturing method for a shaped object for shaping the shaped object by layering a layer of shaped object material, which is a material of the shaped object, in a layering direction set in advance, the manufacturing method comprising slice data generating stage of generating a plurality of pieces of slice data, each of the plurality of pieces of slice data indicating a cross-section of the shaped object at positions different from each other in the layering direction; and shaping stage of shaping the shaped object by ejecting the shaped object material based on the plurality of pieces of slice data; wherein in at least either one of the slice data generating stage or the shaping stage, a process of applying a fluctuation, in which a position seen from an outer side of the shaped object changes in an irregular form, to the shaped object is carried out, wherein the fluctuation is applied at least on an outer edge portion of the layer of the shaped object material.

2. The manufacturing method for the shaped object according to claim 1, wherein a position of a unit of ejecting the shaped object material is defined as a voxel position, the slice data is data specifying an ejecting position, which is the voxel position where the shaped object material is to be ejected; in the shaping stage, the shaped object material is ejected to the ejecting position specified in the respective slice data to form a layer of the shaped object material corresponding to the respective slice data;

in the slice data generating stage, an intermediate data generating process, which is a process of generating intermediate data, which is data used for generation of the slice data, the intermediate data generating process generating a plurality of pieces of intermediate data each indicating a shape of a cross-section of the shaped object at positions different from each other in at least the layering direction based on shaped object data, which is data indicating the entire shaped object, and a data converting process, which is a process of generating the respective slice data based on the respective intermediate data, the data converting process generating the plurality of pieces of slice data while changing a contour of the slice data, which is a portion corresponding to an outer peripheral surface of the shaped object when generating the slice data from the intermediate data of at least one part as a process of applying the fluctuation to the shaped object are carried out; and in the data converting process, the slice data of at least one part is differed from the corresponding intermediate data in an arrangement of the ejecting positions at an outermost periphery to generate the slice data in which the contour of the slice data is different from a contour of the intermediate data.

3. The manufacturing method for the shaped object according to claim 2, wherein a portion where a position in a plane orthogonal to the layering direction of the contour of the slice data is the same as the slice data adjacent in the layering direction is defined as a step overlapping portion, in the data converting process, the contour of the slice data of at least one part is differed from the corresponding intermediate data so that the step overlapping portion becomes less than when using the slice data in which the contour of the slice data is the same as the contour of the intermediate data.

4. The manufacturing method for the shaped object according to claim 2, wherein in the data converting process, the contour of the slice data of at least one part is differed from the corresponding intermediate data so that the fluctuation is increased than when the slice data in which the contour of the slice data is the same as the contour of the intermediate data is used.

5. The manufacturing method for the shaped object according to claim 2, wherein in the shaping stage, an ejection head that ejects the shaped object material is caused to carry out a main scanning operation of ejecting the shaped object material while relatively moving in a main scanning direction set in advance with respect to the shaped object being shaped;

a direction orthogonal to the main scanning direction and the layering direction is defined as a sub-scanning direction, in the data converting process, with respect to the slice data of at least one part, the contour of the slice data of at least one part is differed from the corresponding contour of the intermediate data so that some ejecting positions configuring the contour of the slice data are shifted in a direction of at least either one of the main scanning direction or the sub-scanning direction compared to the slice data in which the contour of the slice data is the same as the corresponding contour of the intermediate data.

6. The manufacturing method for the shaped object according to claim 5, wherein in the data converting process, with respect to the slice data of at least one part, the contour of the slice data of at least one part is differed from the corresponding contour of the intermediate data so that the ejecting position of one part configuring the contour of the slice data is shifted by one voxel position in a direction of at least either one of the main scanning direction or the sub-scanning direction, compared to the slice data in which the contour of the slice data is the same as the corresponding contour of the intermediate data.

7. The manufacturing method for the shaped object according to claim 2, wherein the intermediate data is data indicating the ejecting position in a same format as the slice data;

in the data converting process, a mask for changing a specification of the ejecting position with a pattern set in advance is applied with respect to the intermediate data of at least one part to generate the slice data in which the contour of the slice data is different from the contour of the intermediate data.

8. The manufacturing method for the shaped object according to claim 7, wherein in the shaping stage, a support material, which is a material of a support layer that supports the shaped object being shaped, is further ejected; and the mask is a mask that changes the specification of the ejecting position to eject the support material to some ejecting positions instead of the shaped object material.

9. The manufacturing method for the shaped object according to claim 2, wherein in the shaping stage, an ejection head that ejects the shaped object material is caused to carry out a main scanning operation of ejecting the shaped object material while relatively moving in a main scanning direction set in advance with respect to the shaped object being shaped, and causing the ejection head to carry out a plurality of main scanning operations at a time of forming a layer of shaped object material corresponding to one piece of slice data;

the intermediate data is data specifying the ejecting position in the same format as the slice data; and in a contour changing process, the slice data in which the ejecting position for ejecting the shaped object material in some main scanning operations of the plurality of main scanning operations has a position in the main scanning direction shifted compared to the ejecting position specified in the intermediate data.

10. The manufacturing method for the shaped object according to claim 2, wherein in the data converting process, the contour of the slice data of at least one part is differed from the corresponding contour of the intermediate data so that at least one part of a surface of the shaped object has a matte tone.

11. The manufacturing method for the shaped object according to claim 1, wherein n the shaping stage, an ejection head that ejects the shaped object material is caused to carry out a main scanning operation of ejecting the shaped object material while relatively moving in a main scanning direction set in advance with respect to the shaped object being shaped, and the ejection head is caused to carry out a plurality of main scanning operations at a time of forming a layer of shaped object material corresponding to one piece of slice data;

as a process of applying the fluctuation to the shaped object, a reference position to become a reference of the ejecting position for ejecting the shaped object material in the main scanning operation is set so that the reference position set with respect to some main scanning operations of the plurality of main scanning operations has a position in the main scanning direction shifted with respect to the reference position set with respect to other main scanning operations.

12. The manufacturing method for the shaped object according to claim 1, wherein a range in which a step of a height worth a plurality of layers of the layer of shaped object material is formed by carrying out the process of applying the fluctuation to the shaped object is smaller than when the fluctuation is not applied.

13. A manufacturing method for a shaped object for shaping the shaped object by layering a layer of shaped object material, which is a material of the shaped object, in a layering direction set in advance, the manufacturing method comprising slice data generating stage of generating a plurality of pieces of slice data, each of the plurality of pieces of slice data indicating a cross-section of the shaped object at positions different from each other in the layering direction; and shaping stage of shaping the shaped object by ejecting the shaped object material based on the plurality of pieces of slice data; wherein a position of a unit of ejecting the shaped object material is defined as a voxel position, the slice data is data specifying an ejecting position, which is the voxel position where the shaped object material is to be ejected;

in the shaping stage, the shaped object material is ejected to the ejecting position specified in the respective slice data to form a layer of shaped object material corresponding to the respective slice data;

in the slice data generating stage, an intermediate data generating process, which is a process of generating intermediate data, which is data used for generation of the slice data, the intermediate data generating process generating a plurality of pieces of intermediate data each indicating a shape of a cross-section of the shaped object at positions different from each other in at least the layering direction based on shaped object data, which is data indicating the entire shaped object, and a data converting process, which is a process of generating the respective slice data based on the respective intermediate data, the data converting process generating the plurality of pieces of slice data while changing a contour of the slice data, which is a portion corresponding to an outer peripheral surface of the shaped object for at least some intermediate data are carried out; and in the data converting process, the slice data of at least one part is differed from the corresponding intermediate data in an arrangement of the ejecting positions at an outermost periphery to generate the slice data in which the contour of the slice data is different from the contour of the intermediate data.

14. A shaping system that shapes a shaped object, the shaping system shaping the shaped object through a manufacturing method by layering a layer of shaped object material, which is a material of the shaped object, in a layering direction set in advance, the manufacturing method comprising:

slice data generating stage of generating a plurality of pieces of slice data, each of the plurality of pieces of slice data indicating a cross-section of the shaped object at positions different from each other in the layering direction; and shaping stage of shaping the shaped object by ejecting the shaped object material based on the plurality of pieces of slice data; wherein in at least either one of the slice data generating stage or the shaping stage, a process of applying a fluctuation, in which a position seen from an outer side of the shaped object changes in an irregular form, to the shaped object is carried out, wherein the fluctuation is applied at least on an outer edge portion of the layer of the shaped object material.

* * * * *